United States Patent
Graefe et al.

(10) Patent No.: US 10,992,752 B2
(45) Date of Patent: Apr. 27, 2021

(54) SENSOR NETWORK CONFIGURATION MECHANISMS

(71) Applicant: Intel Corporation, Santa Clara, CA (US)

(72) Inventors: Ralf Graefe, Haar (DE); Florian Geissler, Munich (DE)

(73) Assignee: Intel Corporation, Santa Clara, CA (US)

(*) Notice: Subject to any disclaimer, the term of this patent is extended or adjusted under 35 U.S.C. 154(b) by 16 days.

(21) Appl. No.: 16/368,231

(22) Filed: Mar. 28, 2019

(65) Prior Publication Data

US 2019/0222652 A1 Jul. 18, 2019

(51) Int. Cl.

| | |
|---|---|
| *H04L 29/08* | (2006.01) |
| *H04Q 9/00* | (2006.01) |
| *H04W 4/029* | (2018.01) |
| *H04W 4/40* | (2018.01) |
| *H04W 84/18* | (2009.01) |
| *H04W 4/38* | (2018.01) |

(52) U.S. Cl.
CPC .............. *H04L 67/12* (2013.01); *H04Q 9/00* (2013.01); *H04W 4/029* (2018.02); *H04W 4/38* (2018.02); *H04W 4/40* (2018.02); *H04W 84/18* (2013.01); *H04Q 2209/40* (2013.01)

(58) Field of Classification Search
CPC ........ H04L 67/12; H04W 4/38; H04W 4/029; H04W 4/40; H04W 84/18; H04Q 9/00; H04Q 2209/40

See application file for complete search history.

(56) References Cited

U.S. PATENT DOCUMENTS

| 10,330,480 B1 * | 6/2019 | Krishnaswamy .... G01C 21/165 |
|---|---|---|
| 2007/0233359 A1 | 10/2007 | Ferman et al. |
| 2014/0039837 A1 | 2/2014 | Hart et al. |
| 2014/0358436 A1 | 12/2014 | Kim |

(Continued)

FOREIGN PATENT DOCUMENTS

| DE | 102016206631 A1 | 10/2017 |
|---|---|---|
| JP | 2011-191923 A | 9/2011 |
| KR | 10-2010-0091085 A | 8/2010 |

OTHER PUBLICATIONS

Office Action dated Nov. 18, 2019 for U.S. Appl. No. 15/857,975, 20 pages.

(Continued)

*Primary Examiner* — Amine Benlagsir

(74) *Attorney, Agent, or Firm* — Schwabe, Williamson & Wyatt, P.C.

(57) ABSTRACT

Systems, methods, and computer-readable media are provided for wireless sensor networks (WSNs), including sensor deployment mechanisms for road surveillance. Disclosed embodiments are applied to design roadside infrastructure with optimal perception for a given geographic area. The deployment mechanisms account for the presence of static and dynamic obstacles, as well as symmetry aspects of the underlying environment. The deployment mechanisms minimize the number of required sensors to reduce costs and conserve compute and network resources, and extended infrastructure the sensing capabilities of sensor networks. Other embodiments are disclosed and/or claimed.

23 Claims, 11 Drawing Sheets

(56) References Cited

U.S. PATENT DOCUMENTS

| | | |
|---|---|---|
| 2016/0212244 A1 | 7/2016 | Stojanovski et al. |
| 2017/0176998 A1 | 6/2017 | Fechner et al. |
| 2018/0004213 A1 | 1/2018 | Absmeier et al. |
| 2018/0045521 A1 | 2/2018 | Wege et al. |
| 2018/0147721 A1 | 5/2018 | Griffin et al. |
| 2018/0154899 A1 | 6/2018 | Tiwari et al. |
| 2018/0188039 A1 | 7/2018 | Chen et al. |
| 2018/0227973 A1 | 8/2018 | Tsuboi et al. |
| 2019/0120946 A1 | 4/2019 | Wheeler et al. |
| 2019/0323855 A1 | 10/2019 | Mahler et al. |
| 2019/0389472 A1* | 12/2019 | Zhang .................. G01B 11/303 |
| 2020/0043343 A1* | 2/2020 | Branson .................. G01S 17/87 |

OTHER PUBLICATIONS

Final Office Action dated Apr. 9, 2020 for U.S. Appl. No. 15/857,975, 12 pages.

International Search Report and Written Opinion dated Mar. 15, 2019 for International Application No. PCT/US2018/062486, 12 pages.

International Preliminary Report on Patentability dated Jul. 9, 2020 for International Patent Application No. PCT/US2018/062486, 9 pages.

Office Action dated Oct. 6, 2020 for U.S. Appl. No. 15/857,975, 10 pages.

\* cited by examiner

SENSOR NETWORK CONFIGURATION MECHANISMS

FIELD

Embodiments discussed herein are related to computing, and in particular, to Fog and Edge sensor networks.

BACKGROUND

Computer-assisted or (semi-)autonomous driving (CA/AD) vehicles may include various technologies for perception, such as camera feeds and sensory information. European Telecommunications Standards Institute (ETSI) publishes an Intelligent Transport System (ITS) standards, which includes telematics and various types of communications between vehicles (e.g., V2V), between vehicles and fixed locations (e.g., V2I), between vehicles and networks (e.g., V2N), between vehicles and handheld devices (e.g., V2P), and the like. Dedicated Short Range Communication (DSRC) and/or Cellular Vehicle-to-everything (C-V2X) protocols provide communications between CA/AD vehicles and the roadside infrastructure. Cooperative-ITS (C-ITS) may support full autonomous driving including wireless short range communications (ITS-G5) dedicated to automotive ITS and road transport and traffic telematics (RTTT). C-ITS may provide connectivity between road participants and infrastructure.

Roadside infrastructure may provide mapping services to provide dynamic maps of a physical environment, such as roads or highways, for use by CA/AD vehicles. Input for such mapping services may be provided by CA/AD vehicles equipped with sensors and/or by fixed sensor infrastructure. The perception of the environment, however, can be considerably impaired by the failure of individual sensing components. Similarly, the emergence of obstacles in the physical environment can render sensing elements wholly or partially inoperable. To provide the mapping services, the sensing system requires a high level of resilience or the ability to cope with unexpected challenges. This becomes especially important in safety-critical domains, such as the operation of CA/AD vehicles.

DETAILED DESCRIPTION

Figure 1:
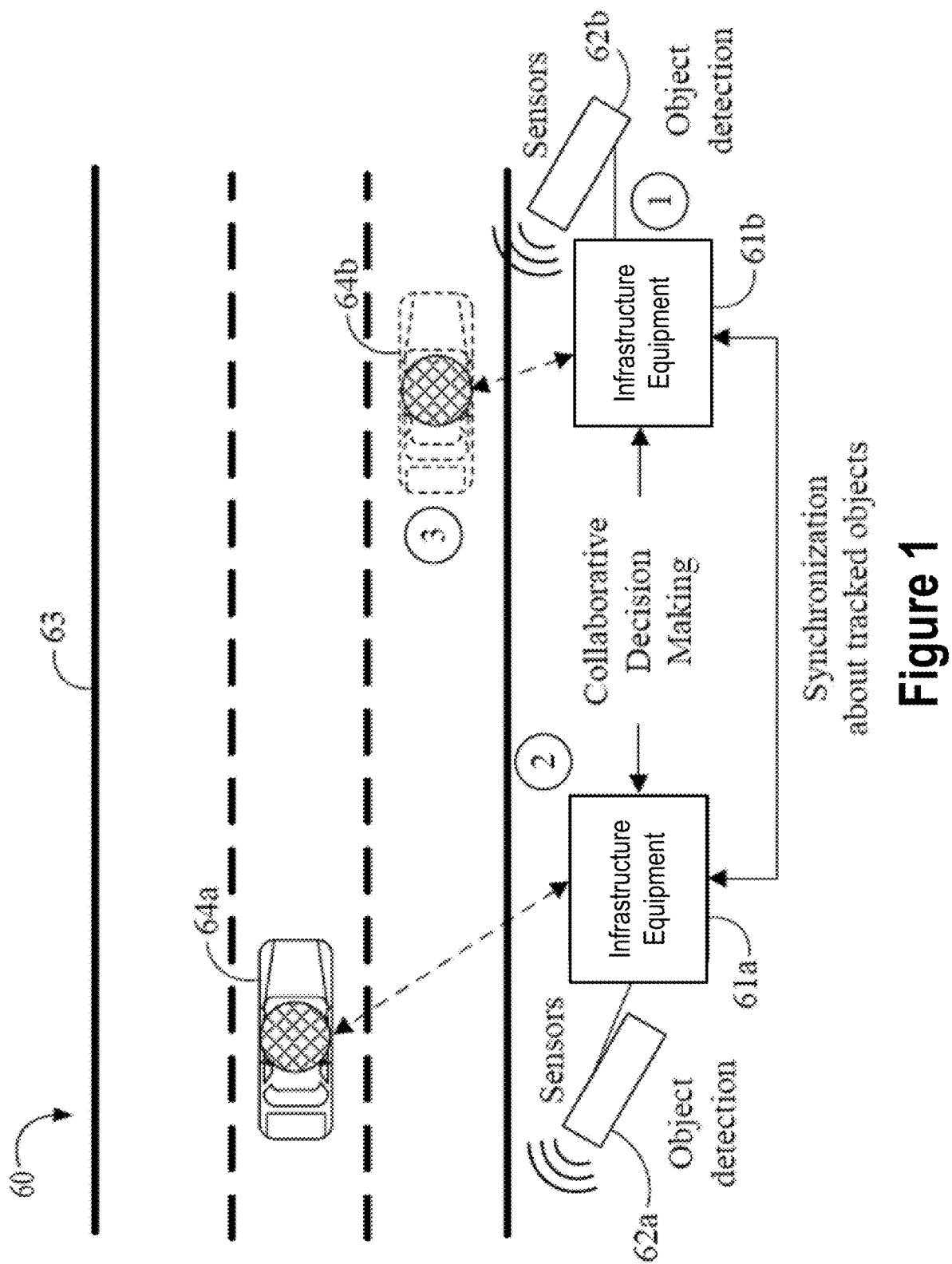
FIG. 1 illustrates an example environment in which various embodiments of the present disclosure may be practiced.

Disclosed embodiments are related to sensor networks, and in particular, sensor networks for vehicular applications. Many vehicular service providers (e.g., mapping, navigation, traffic management, etc.) and communication services (e.g., C-V2X, DSRC, etc.) use sensor data to provide accurate and up-to-date services. As examples, the European SAFESPOT project studied roadside infrastructure for monitoring individual roads using camera and laser sensors, and the German KoRA9 project studied roadside infrastructure for monitoring highways using radar sensors. Both SAFESPOT and KoRA9 use a simplistic linear sensor network topology. However, improved sensor deployment strategies are needed for more complex and dynamic environments such as smart cities, campuses, or automated parking systems. These up-to-date services require dependable perception capabilities of the sensor network, which makes optimal sensor placement an important prerequisite. Additionally, the sensor data provided to these services include sensor data from fixed sensor arrays, as well as sensor data from vehicle mounted/embedded sensors. The sensor data from these sources may become unavailable at different points in time (i.e., "occlusions"), which may negatively affect the ability for service providers to provide their services. In order for the infrastructure to be reliable, the data it serves needs to be complete, correct, accurate and timely.

The present disclosure provides embodiments for the arrangement of sensing elements in a given physical area to provide the most optimal coverage of the physical area. The embodiments also include mechanisms for dynamically reconfiguring the sensor arrangement based on various trigger events. Embodiments include a system for the surveillance of a given area of interest, where individual sensors are used to determine position, speed, travel direction, and other properties of moving objects (e.g., CA/AD vehicles, pedestrians, etc.). During a first mode of operation, the sensors are deployed to specific positions in the area of interest and set to initial sensing orientations, and are able to change their sensing orientations trough electromechanical adjustments during a second operation mode. In the first operation mode, an optimization algorithm is used to find an optimal placement of the sensors in terms of position and orientation in an environment model. The environment model may be a two-dimensional (2D) or three-dimensional (3D) grid (or cell) based model. The environment model is based on the static environment of the physical area and properties of the individual sensors (e.g., reading range, viewing/opening angle, sensing type, deployment costs, etc.). Semi-static environment information may also be accounted for in creation of the environment model. Examples of the semi-static environment information may include semi-transparent obstacles or frequently occupied regions of the physical area. The embodiments herein improve conventional sensor arrangement mechanisms not only by accounting for the possibility of line of sight (LoS) obstacles and priority areas, but further introduce transparent obstacles as a new feature to account for object dynamics. The variable degree of transparency reflects the expected probability of dynamic object-based occlusions.

An example of the optimization algorithm may include a genetic (evolutionary) algorithm. A Genetic Algorithm (GA) is a metaheuristic and/or a search-based optimization technique inspired by the principles of Genetics and Natural Selection where the fittest individuals are selected for reproduction in order to produce offspring of the next generation. GAs start with a pool or a population of possible solutions to the given problem, which undergo recombination and mutation, producing new children. This process is repeated over various generations. Each or candidate solution is assigned a fitness value based on an objective function value and the fitter candidates are given a higher chance to mate and yield more "fitter" candidates. The genetic algorithm includes a crossover function and a mutation function. The crossover function is used to identify the most useful sensors and discard the least useful sensors. The crossover function rates or ranks the individual sensors, selects and combines the best candidates until the full area of interest is covered. The sensor ranking involves, for each sensor, identifying a number of previously uncovered cells in the environment model that the sensor will cover given the current orientation, and a number of cells in the environment model that are in range of the sensor. A sensor is picked at random in the event of a tie (e.g., when two or more sensors have a same ranking). After all or most of the cells in the environment model are covered, all remaining sensors are discarded to avoid deployment of an abundant number of sensors. The mutation function involves modifying each the position, orientation angle, or deletion of each sensor produced by the crossover function. In some embodiments, a Gaussian mutation rate, and a mutation function that has a finite chance of adjusting, removing, or adding a sensor in a random way, is used. The outcome of the first operation mode is stored for later use. The second operation mode involves dynamically reconfiguring the sensor orientations (and/or placement) based on one or more trigger events. The triggers may include, for example, sensor failure (e.g., sensor outage, erratic sensor outputs, etc.), detection of an unexpected semi-dynamic obstacle (e.g., a traffic accident), and/or an external event trigger (e.g., a change of the area of interest, or a change of the traffic conditions). Once a trigger is detected, the same or similar optimization algorithm is used as was discussed for the first operation mode.

In disclosed embodiments, infrastructure equipment (e.g., a roadside unit (RSU)) includes or is communicatively coupled with a sensor array. The sensor array includes one or more sensors mounted on the infrastructure equipment, one or more fixed sensors deployed at different locations of a designated coverage area, or the like. During the first operation mode, the infrastructure equipment or a remote system (e.g., a cloud service, edge computing system, or the like) determines optimal deployment positions for the sensors of the senor array at different points in the coverage area to maximize coverage capabilities while minimizing the number of sensors and compute, storage, and/or networking resources needed to cover the coverage area. The infrastructure equipment uses the sensors in the sensor array to capture sensor data that is representative of objects in the coverage area. The infrastructure equipment (or remote system) tracks objects (e.g., vehicles, pedestrians, etc.) in the coverage area. The infrastructure equipment (or remote system) determines regions in the coverage area that are not adequately covered by the sensor array (e.g., "coverage holes" or "occlusions"), for example, by identifying gaps in currently available sensor data (e.g., "perception gaps"), sensor failures, detecting events that are occurring (or not occurring) in the coverage area, or the like. When the infrastructure equipment (or remote system) identifies a perception gap, then the infrastructure equipment (or remote system) will initiate the second operation mode to reconfigure the orientation of sensing elements of the sensors to account for or eliminate the perception gap (i.e., "filling the perception gap"). In the second operation mode, the infrastructure equipment (or remote system) detects a trigger event; determines a new sensor arrangement based on a previous or current sensor arrangement, sensor data obtained from the individual sensors, and sensor parameters or capabilities of the individual sensors in the sensor array; and generates and sends instructions to instructions to individual sensors in the sensor array to implement changes to the sensor arrangement based on the determined new/updated sensor arrangement. Other embodiments are described and/or claimed.

I. Sensor Deployment And (Re)Configuration Embodiments

Turning now to FIG. 1, an example environment 60 in which various embodiments of the present disclosure may be practiced, is shown. Environment 60 includes a system of sensors, compute units, and wireless communication technology. The infrastructure equipment 61a, 61b are communicatively coupled to sensor arrays 62a, 62b, respectively. The sensor arrays 62a, 62b each include one or more sensors positioned along a respective section of a physical coverage area 63. A section of the physical coverage area 63 covered by an individual sensor may be referred to as a "sector." Sensors of the sensor arrays 62a, 62b detect one or more objects 64a, 64b as those objects 64a, 64b travel within or through the respective sectors of the physical coverage area 63. The objects 64a, 64b may include wireless communication technology to communicate with the infrastructure equipment 61a, 61b, and with each other. The sensor array 62a includes one or more sensors that provide object detection information to the infrastructure equipment 61a, while the sensor array 62b includes one or more sensors that provide object detection information to the infrastructure equipment 61b (e.g., via radar, ultrasonic, camera, etc.). In most embodiments, the sensors of the sensor arrays 62a, 62b are fixed or station, although in some embodiments, moveable or semi-fixed sensors could be used, for example, sensors that are capable of being moved along tracks, rails, etc., or sensors mounted on moveable robots, unmanned aerial vehicles (UAVs), or other like apparatuses. The infrastructure equipment 61a, 61b may also exchange information about the vehicles 64a, 64b that they are tracking and may support collaborative decision making.

In this example, the objects 64a, 64b are vehicles (referred to as "vehicles 64a, 64b") that are travelling on a road included in the coverage area 63 (referred to as "road 63"). For illustrative purposes, the following description is provided for deployment scenarios including vehicles in a 2D freeway/highway/roadway environment wherein the vehicles are automobiles. However, the embodiments described herein are also applicable to other types of vehicles, such as trucks, busses, motorboats, motorcycles, electric personal transporters, bicycles, and/or any other motorized devices capable of transporting people and/or goods. Also, embodiments described herein may be applicable to 3D deployment scenarios where some or all of the vehicles are implemented as flying objects, such as aircraft, drones, UAVs, and/or to any other like motorized devices.

The vehicles 64a, 64b may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The vehicles 64a, 64b shown by FIG. 1 may represent motor vehicles of varying makes, models, trim, etc. The wireless communication technology employed by the vehicles 64a, 64b may include V2X communication technology, which allow the vehicles 64a, 64b to communicate directly with one another and with infrastructure equipment 61a, 61b. The V2X communication technology may refer to 3GPP C-V2X technology (e.g., based on LTE, 5G/NR, and beyond) or Institute of Electrical and Electronics Engineers (IEEE) 802.11p V2X technology (e.g., DSRC in the USA or ITS-G5 in the EU). Some or all of the vehicles 64a, 64b include positioning circuitry to (coarsely) determine their respective geolocations and communicate their current position with the infrastructure equipment 61a, 61b in a secure and reliable manner. This allows the vehicles 64a, 64b to synchronize with the infrastructure 61a, 61b. Additionally, some or all of the vehicles 64a, 64b may be CA/AD vehicles, which may include artificial intelligence (AI) and/or robotics to assist vehicle operation.

The infrastructure equipment 61a, 61b may provide environmental sensing services, and in this example, the infrastructure equipment 61a, 61b may provide environmental sensing services for vehicles 64. The environmental sensing services provided by the infrastructure equipment 61a, 61b may be used for real-time mapping of dynamic environments, such as road 63. The real-time mapping of dynamic environments is used for high-reliability decision-making systems, such as when vehicles 64 are CA/AD vehicles 64. In ITS, the real-time mapping may be used for a real-time traffic status map called the Local Dynamic Map (LDM), that structures all relevant data for vehicle operation and that also provides information about highly dynamic objects, such as vehicles 64 on the road 63. LDM is a real-time traffic status map that structures relevant data for driving and provides information about highly dynamic objects, such as vehicles on a road. The input for the LDM can be provided by user equipment (UEs) equipped with sensors, such as one or more vehicles 64, or by the fixed sensor arrays 62a, 62b deployed along the road 63. Regardless of the source of the sensor data, the environment model built from sensor data needs to be as complete and accurate as possible in order to reliably provide the real-time mapping services. In embodiments, the infrastructure equipment 61a, 61b, provides real-time mapping services by monitoring objects 64a, 64b using individual sensors in the sensor arrays 62a, 62b. The infrastructure equipment 61a, 61b may each include map processing subsystem, which uses the provided sensor data to determine the position, speed, direction, and other properties about the moving objects 64a, 64b in the coverage area 63, and to generate a real-time dynamic map of the coverage area 63. The real-time mapping services may be provided as discussed in co-pending U.S. application Ser. No. 16/234,260 titled "SENSOR NETWORK ENHANCEMENT MECHANISMS," filed on Dec. 27, 2018, which is hereby incorporated by reference in its entirety for all purposes.

As alluded to previously, the infrastructure equipment 61a, 61b is/are communicatively coupled to respective sensor arrays 62a, 62b, and the infrastructure equipment 61a, 61b uses the sensors of the sensor arrays 62a, 62b to detect an objects 64a, 64b in the coverage area 63. These stationary sensors may be deployed along (at or around) the coverage area 63 in a way such that few or no blind spots may remain under most traffic conditions. According to various embodiments, an optimization algorithm is used to automatically deploy sensors in a particular sensor arrangement in or around the coverage area 63, possibly with different sensor types, in order to maximize the quality of sensor information in the form of perceptional completeness, minimization of costs by optimizing the number of required sensors to provide full or nearly-full coverage of the coverage area 63, and maximization of the potential overlap of sensing areas to allow for subsequent dynamic reconfiguration.

In current traffic monitoring systems, a certain portion of the environmental perception is lost if one or more sensors fail, and the reduced level of perception persists until the failed sensors are replaced with new operational sensors. Furthermore, the quality or level of perception is also reduced in current traffic monitoring systems when occlusions in the coverage area 63 occur due to, for example, objects being disposed in the LoS of one or more sensors in a sensor array 62, which persists until the occlusion is removed from the LoS of the affected sensor(s). In contrast to the current traffic monitoring systems, in various embodiments, the sensors in the sensor arrays 62a, 62b are dynamically reconfigured to obviate or otherwise account for constraints such as sensor outage or failure, occlusions by objects/obstacles temporary in the LoS of one or more sensors, changes of the usage scenario (this can include the demand for multi-degree coverage in certain areas), and/or changes in the size, shape, etc. of the coverage area 63. These, and other aspects of the embodiments of the present disclosure, are further described infra.

Figure 2:
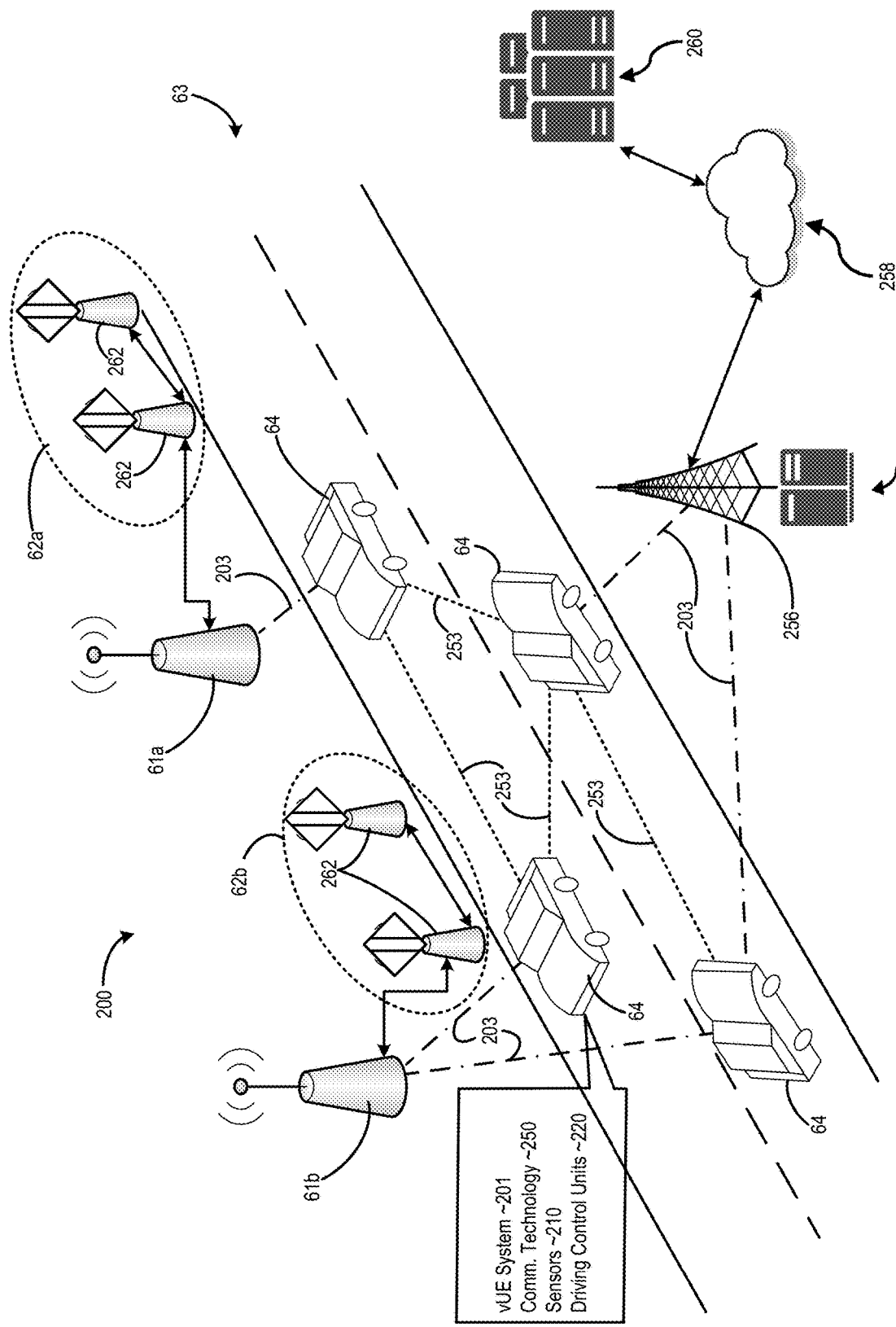
FIG. 2 illustrates an example environment for incorporating and using the sensor network technology of the present disclosure.

Referring now to FIG. 2, wherein an overview of an environment 200 for incorporating and using the sensor network technology of the present disclosure, is illustrated. As shown, for the illustrated embodiments, example environment 200 includes a plurality of vehicles 64 (including vehicles 64a, 64b of FIG. 1), infrastructure equipment 61a, 61b, one or more edge nodes 257, and access node 256, cloud 258, and one or more servers 260.

The environment 200 may be considered to be a type of wireless sensor network (WSN), where the entities in the environment 200 may be considered "network nodes" or "nodes" that communicate among themselves in multi-hop fashion. The term "hop" may refer to an individual node or intermediary device through which data packets traverse a path between a source device and a destination device. Intermediate nodes (i.e., nodes that are located between a source device and a destination device along a path) forward packets to a next node in the path, and in some cases, may modify or repackage the packet contents so that data from a source node can be combined/aggregated/compressed on the way to its final destination. In the example of FIG. 2, the architecture of environment 200 is a de-centralized V2X network comprising vehicles 64 with one or multiple network interfaces, where infrastructure equipment 61a, 61b act as road side units (RSUs). The V2X applications can use "cooperative awareness" to provide more intelligent services for end-users. For example, the vehicles 64, radio access nodes, pedestrian UEs, etc., may collect knowledge of their local environment (e.g., information received from other vehicles or sensor equipment in proximity) to process and share that knowledge in order to provide more intelligent services, such as cooperative collision warning, autonomous driving, and the like. The V2X cooperative awareness mechanisms are similar to the CA services provided by ITS system as discussed previously.

The plurality of vehicles 64 shown by FIG. 2 may be the same or similar as vehicles 64a, 64b discussed previously, and may be collectively referred to as a "vehicle 64" or "vehicles 64." Some or all of the vehicles 64 may include vehicular user equipment (vUE) system 201, one or more sensors 220, and one or more driving control units (DCUs) 220. The vUE system 201 is a computing device or system that is physically mounted on, built in, embedded or otherwise included in a vehicle 64. The vUE system 201 includes a number of user or client subsystems or applications, such as an in-vehicle infotainment (IVI) system, an in-car entertainment (ICE) devices, an Instrument Cluster (IC), a head-up display (HUD) system, onboard diagnostic (OBD) systems, dashtop mobile equipment (DME), mobile data terminals (MDTs), a navigation subsystem/application, a vehicle status subsystem/application, and/or the like. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a communications interface, such as the communication technology 250. Moreover, where ITS technology is used, the vUE system 201 and/or the communication technology 250 may be referred to as a "vehicle ITS-S" or simply as an "ITS-S."

The DCUs 220 include hardware elements that control various subsystems of the vehicles 64, such as the operation of the engine, the transmission, steering, braking, etc., and include hardware elements, such as Electronic Engine Management System (EEMS), electronic/engine control units (ECUs), electronic/engine control modules (ECMs), embedded systems, microcontrollers, control modules, engine management systems (EMS), and the like. The sensors 220 are configured to provide various sensor data to the DCUs 220 and/or other vehicle subsystems to enable the DCUs 220 and/or one or more other vehicle subsystems to control respective systems of the vehicles 64. The sensing capabilities of the sensors 220 may include magnetic, thermal, infrared, acoustic, radar, and/or other like sensing capabilities.

Further, the vUE system 201 includes or is coupled with a communication technology 250, which allow the vehicles 64 to, among other things, share information with one another and with infrastructure equipment 261. For example, the communication technology 250 utilizes connections (also referred to as "channels" or "links") 203, each of which comprises a physical communications interface or layer. In this example, the connections 203 are illustrated as air interfaces to enable communicative couplings, and can be consistent with WAN, wireless LAN (WLAN), or any other IEEE 802.11 protocols (e.g., WiFi®, DSRC/WAVE, etc.); cellular communications protocols (e.g., GSM, CDMA, PTT, POC, UMTS, LTE, 5G/NR, WiMAX, etc.), and/or any of the other communications protocols, such as those discussed herein. The communication technology 250 may also enable the vehicles 64 to directly exchange communication data using direct links 253, which may include DSRC interfaces, 3GPP interfaces (Proximity Services (ProSe), sidelink (SL), or device-to-device (D2D) interfaces), Bluetooth® interfaces, and/or some other suitable direct communication technology, such as one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT/ANT+ protocols; Z-Wave; UPnP; and/or the like). As alluded to previously, the communication technology 250 may include or incorporate ITS technology, which provides an abstraction from the implementation details of the underlying communication technology 250. As discussed in more detail infra, the communication technology 250 enables the vehicles 64 to provide acknowledgments (ACKs), position data, and/or sensor data from local sensors 220 to the infrastructure equipment 61a, 61b via channels 203. In some embodiments, the ACKs, positions data, and/or sensor data from local sensors 220 may be relayed to the infrastructure equipment 61a, 61b via one or more vehicles 64 over respective direct links 253.

The communication technology 250 is configured to connect, for example, communicatively couple, the vehicles 64 with one or more access networks (ANs) or radio access networks (RANs). The (R)ANs can include one or more (R)AN nodes, such as infrastructure equipment 61a, 61b, and RAN node 256 shown by FIG. 2, which enable connections with corresponding networks. As used herein, the terms "access node," "access point," or the like may describe network elements or other like equipment that provides the radio baseband functions and/or wire-based functions for data and/or voice connectivity between a network and one or more users. As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host one or more virtual machines. The AN nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The ANs are configured to fulfill various radio network controller (RNC) functions such as radio bearer management, uplink and downlink dynamic radio resource management and data packet scheduling, mobility management, and the like. An example implementation of the ANs is shown and described with regard to Figure S2.

In the example shown by FIG. 2, the infrastructure equipment 61a, 61b are road side units or Roadside ITS-Ss, and the (R)AN node 256 is a cellular base station. The term "Road Side Unit" or "RSU" refers to any transportation infrastructure entity implemented in or by an gNB/eNB/TRP/RAN node or a stationary (or relatively stationary) UE, and the term "Roadside ITS Station" refers to an ITS sub-system in the context of roadside ITS equipment. The infrastructure equipment 61a, 61b may be located at a roadside to provide network connectivity services and transport-based services, such as the real-time mapping services discussed herein, to passing vehicles 64. Each infrastructure equipment 61a, 61b include a computing system communicatively coupled with individual sensors 262 via interface circuitry and/or communication circuitry. In ITS-based embodiments, the interface circuitry and/or communication circuitry of the infrastructure equipment 61a, 61b may be a road equipment data gateway, which is a specific gateway to the road side equipment (e.g., including sensor arrays 62a, 62b, traffic lights, gates or barriers, electronic signage, etc.) from which the infrastructure equipment 61a, 61b may obtain sensor data and other data (e.g., traffic regulation data, electronic signage data, etc.). In these embodiments, a known communication standard may be used for communicating between the infrastructure equipment 61a, 61b and the road side equipment, such as DIASER or the like. The infrastructure equipment 61a, 61b may also include internal data storage circuitry to store coverage area 63 map geometry and related data, traffic statistics, media, as well as applications/software to sense and control on-going vehicular and pedestrian traffic.

The interface circuitry communicatively couples the infrastructure equipment 61a, 61b with individual sensors 262 within the sensor arrays 62a, 62b. Individual sensors 262 cover respective sectors of the physical coverage area 63. The individual sensors 262 may include various sensing capabilities, such as visual (e.g., image or video), radar, LiDAR, IR, ambient light, ultrasonic sensing; sound; etc. In embodiments, consecutive infrastructure equipment 61a, 61b may be deployed in such a way that the respective sectors of the physical coverage area 63 partially overlap, which may allow a continuous and substantially complete map of the coverage area 63 to be generated. The interface circuitry obtains sensor data from the individual sensors 262, which is representative of the respective sectors covered by the individual sensors 262 and objects 64 within or moving through the respective sectors. The coverage area 63 for tracking/monitoring activity is bounded by the observable or sensing range of the individual sensors 262, and other existing objects such as roads, buildings, geographic features, and the like, which may or may not limit the movement of the objects 64. The sensor data may indicate or represent, inter alia, location, direction, and speed of the objects 64. The computing system in the RSE 61 uses the obtained sensor data for real-time mapping services, which may involve computing or generating a dynamic map of the coverage area 63 including representations of the dynamic objects 64 and their movements. The dynamic map, or data for generating the dynamic map, may be communicated to individual objects 64.

In some embodiments, the computing system of the infrastructure equipment 61a, 61b logically divides the observation area 63, or individual sectors, into a grid of 2D cells or 3D cubes. In an example, 2D cells may be used when the observation area 63 is a 2D field or one plane (e.g., a roadway), and 3D cubes may be used when the coverage area 63 includes multiple planes (e.g., overlapping highway intersections or bridges. In some embodiments, each grid cell has the same size with dimensions defined in terms of absolute geolocation coordinates. In any of these embodiments, the computing system of the infrastructure equipment 61a, 61b calculates a grid-based environment model that is overlaid on top of the observed coverage area 63. The grid-based environment model allows the computing system of the infrastructure equipment 61a, 61b to target particular objects 64 in specific grid cells for purposes of requesting data from those targeted objects 64.

In embodiments, the real-time mapping services involves detecting occlusions in the sensed/observed environment (e.g., coverage area 63), and requesting sensor data from selected vehicles 64. In these embodiments, the infrastructure equipment 61a, 61b assign a unique identifier (ID) to each object 64 during a handshake procedure (see e.g., Figure X2). The infrastructure equipment 61a, 61b use the unique ID assigned during initial handshake procedure (see e.g., Figure X2) to identify each object 64 at any point in time. The infrastructure equipment 61a, 61b may perform the handshake procedure should object 64 be occluded temporarily. The knowledge of the unique ID, location, direction, and speed of each object 64 enables the infrastructure equipment 61a, 61b to request sensor information for specific locations from selected object 64.

The communication circuitry of the infrastructure equipment 61 may operate on the 5.9 GHz DSRC band to provide very low latency communications required for high speed events, such as crash avoidance, traffic warnings, and the like. Additionally, the communication circuitry of the infrastructure equipment 61 may provide a WiFi hotspot (2.4 GHz band) and/or provide connectivity to one or more cellular networks to provide uplink and downlink communications. The computing system and some or all of the communication circuitry of the infrastructure equipment 61 may be packaged in a weatherproof enclosure suitable for outdoor installation, and may include a network interface controller to provide a wired (e.g., Ethernet) connection to a traffic signal controller and/or a backhaul network. The communication circuitry of the infrastructure equipment 61 may be used for broadcasting V2X messages to vehicles 64 or other objects 64 such as pedestrians or other UEs (not shown by FIG. 2). Broadcasting may be enabled using a suitable broadcast or multicast mechanism such as evolved multimedia broadcast multicast service for LTE (eMBMS). In these embodiments, the infrastructure equipment 61 may include or access several functionalities such as a local gateway (LGW), a V2X application server (V2X-AS), a broadcast multicast service center (BM-SC), and a multimedia broadcast multicast service gateway (MBMS-GW) functionality. In some implementations, the infrastructure equipment 61 may also include a traffic-offloading function (TOF) to offload computational tasks for the LGW, V2X-AS, BM-SC, MBMS-GW, and/or other functions to a local edge node 257.

As mentioned previously, in the illustrative embodiment, the RAN node 256 is a cellular base station. The RAN node 256 may be a next generation (NG) RAN node that operates in an NR or 5G system (e.g., a next generation NodeB (gNB)), an Evolved UMTS Terrestrial Radio Access Network (E-UTRAN) that operates in an LTE or 4G system (e.g., an evolved NodeB (eNB)), a legacy RAN such as a UMTS Terrestrial Radio Access Network (UTRAN) or GERAN (GSM EDGE Radio Access Network), a WiMAX RAN node, or some other cellular base station. The RAN node 256 may be implemented as one or more of a dedicated physical device such as a macrocell base station and/or a low power (LP) base station for providing femtocells, picocells or other like cells having smaller coverage areas, smaller user capacity, or higher bandwidth compared to macrocells. In other embodiments, the RAN node 256 may be implemented as one or more software entities running on server computers as part of a virtual network, which may be referred to as a cloud RAN (CRAN), virtual RAN, virtual baseband (BB) unit, cloud-based or virtual BB pool, and/or the like. In other embodiments, the RAN node 256 may represent individual gNB-distributed units (DUs) that are connected to a gNB-centralized unit (CU) via an F1 interface (not shown).

Still referring to FIG. 2, the edge node(s) 257 may include distributed physical and/or virtual compute nodes that perform most or all application computations, data storage and retrieval, and serve requests at or near the requesting entities. The edge node(s) 257 provide services near requesting entities, which reduces the amount of data that may need to be conveyed, the consequent traffic, and the distance the data must travel thereby providing lower latency and reduced transmission costs (in terms of signaling/network resources). In some embodiments, the edge node(s) 257 may execute/process workloads at an enterprise and/or on customer premises. In some embodiments, the edge node(s) 257 may include systems/devices that provide entry points into an enterprise network, service provider network, core network, or cloud 258. In these embodiments, the edge node(s) 258 may include RANs or RAN nodes (e.g., RAN node 256), routers, switches, integrated access devices (IADs), multiplexers, gateway devices (e.g., IoT gateways), MAN or WAN devices, and/or the like. In some embodiments, the edge node(s) 257 may be physical and/or virtual server(s) in close proximity to a last mile network.

In some embodiments, the edge node(s) 257 may include or be part of a Multi-access Edge Computing (MEC) system, which comprises virtual or physical computing system(s) that hosts various MEC applications and provides MEC services to the MEC applications. MEC provides application developers and content providers with cloud-computing capabilities and an information technology service environment at the edge of the network. MEC is a network architecture that allows cloud computing capabilities and computing services to be performed at the edge of a network. MEC provides mechanisms that allow applications to be run and to perform related processing tasks closer to network subscribers (also referred to as "edge users" and the like). In this way, network congestion may be reduced and applications may have better performance. In these embodiments, the edge node(s) 257 may be referred to as a MEC server(s) 257 or MEC host(s) 257. Where a MEC host 257 is implemented as one or more virtual machines (VMs), containers, or the like, the physical devices that implement or operate the MEC host 257 may be referred to as MEC servers or edge servers. The MEC/edge servers may be or include virtualization infrastructure that provides virtualized computing environments and virtualized resources (e.g., "virtualized infrastructure") for the MEC host 257. The MEC applications may run as VMs on top of the virtualized infrastructure. In FIG. 2, the MEC host 257 is co-located with the RAN 256. This implementation may be referred to as a small-cell cloud (SCC) when the RAN 256 is a small cell base station (e.g., pico-cell, femto-cell, etc.) or a WiFi AP, or may referred to as a mobile micro cloud (MCC) when the RAN 256 is a macro-cell base station (e.g., an eNB, gNB, etc.). The MEC host 257 may be deployed in a multitude of arrangements other than as shown by FIG. 2. In a first example, the MEC host 257 may be co-located or operated by an RNC, which may be the case for legacy network deployments, such as 3G networks. In a second example, the MEC host 257 may be deployed at cell aggregation sites or at multi-RAT aggregation points that can be located either within an enterprise or used in public coverage areas. In a third example, the MEC host 257 may be deployed at the edge of a cellular core network. These implementations may be used in follow-me clouds (FMC), where cloud services running at distributed data centers follow the CA/AD vehicles 64 as they roam throughout the network.

In V2X contexts, MEC may be used for advanced driving assistance applications, including real-time situational awareness, see-through sensor sharing services, and high definition local mapping including the dynamic real-time mapping services discussed herein. The MEC host 257 hosts MEC applications running different types of workloads, such as Machine Learning (ML), Augmented Reality (AR), Virtual Reality (VR), AI, data analytics, sensor measurement fusion from vehicles and the environment, real-time mapping applications, privacy enforcement for data streams destined to a cloud, and/or other like compute-intensive applications or application tasks. Different MEC applications can either share data directly and/or share data through a suitable MEC V2X API.

Still referring to FIG. 2, the cloud 258 may represent a cloud computing service, the Internet, a LAN, MAN, WAN, etc., including proprietary and/or enterprise networks for a company or organization, or combinations thereof. The cloud 258 may be a network that comprises computers, network connections among the computers, and software routines to enable communication between the computers over network connections. In this regard, the cloud 258 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without radio frequency (RF) communications circuitry), routers, switches, hubs, radio beacons, base stations, picocell or small cell base stations, and/or any other like network device. Connection to the cloud 258 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the cloud 258 may require that the computers execute software routines which enable, for example, the seven layers of the OSI model of computer networking or equivalent in a wireless (cellular) phone network. Cloud 258 may be used to enable relatively long-range communication such as, for example, between the one or more server(s) 260 and one or more vehicles 64. The cloud 258 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 258 may be associated with network operator who owns or controls equipment and other elements necessary to provide network-related services, such as one or more base stations or access points, one or more servers for routing digital data or telephone calls (e.g., a core network or backbone network), etc. Backbone links between edge node(s) 257 and cloud 258, and between server(s) 260 and cloud 258 may include any number of wired or wireless technologies, and may be part of a LAN, MAN, WAN, or the Internet. In one example, the backbone links are fiber backbone links that couple lower levels of service providers to the Internet, such as the cloud 258.

Still referring to FIG. 2, the one or more server(s) 260 comprise one or more physical and/or virtualized systems for providing functionality (or services) to one or more clients (e.g., vehicles 64) over a network (e.g., cloud 258). The server(s) 260 may include various computer devices with rack computing architecture component(s), tower computing architecture component(s), blade computing architecture component(s), and/or the like. The server(s) 260 may represent a cluster of servers, a server farm, a cloud computing service, or other grouping or pool of servers, which may be located in one or more datacenters. The server(s) 260 may also be connected to, or otherwise associated with one or more data storage devices (not shown). Moreover, the server(s) 260 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Generally, the server(s) 260 offer applications or services that use IP/network resources. As examples, the server(s) 260 may provide traffic management services, cloud analytics, content streaming services, immersive gaming experiences, social networking and/or microblogging services, and/or other like services. In addition, the various services provided by the server(s) 260 may include initiating and controlling software and/or firmware updates for applications or individual components implemented by the vehicles 64. The server(s) 260 could also be configured to support communication services such as Voice-over-Internet Protocol (VoIP) sessions, PTT sessions, group communication sessions, and the like for the vehicles 64 via the cloud 258. In various embodiments, the server(s) 260 may include or may operate as a central ITS-S, which provides centralized ITS applications. In these embodiments, the central ITS-S may play the role of traffic operator, road operator, services provider, and/or content provider. Furthermore, the central ITS-S may require further connection with other backend systems via a network, such as cloud 258. For deployment and performances needs, specific instances of central ITS-S may contain grouping of Applications or Facilities layer entities.

One example of the environments 60 and 200 of FIGS. 1-2 is the Kooperative Radarsensoren für das digitale Testfeld ("KoRA9", translated in English as "cooperative radar sensors for the digital test field A9"). KoRA9 involves adaptation and transfer of automotive radar applications in the field of infrastructure sensors 62 for the field of use of the motorway. In this example use case, 77 GHz chipsets used in current automotive sensors are adapted to the requirements of the infrastructure sensors 62. KoRA9 also involves the aggregation, processing, and transmission of sensor data into the vehicles 64 or to a central database (e.g., associated with servers 260) via an upstream "Infrastructure Fog Appliance" or other like local computing platform (e.g., MEC host 257).

Although the embodiments discussed herein are described in the context of V2X applications, the embodiments herein are also applicable to other types of sensor networks or WSNs. For example, the environment 200 may include Internet of Things (IoT) devices, which are uniquely identifiable embedded computing devices (e.g., within the Internet infrastructure) that comprise a network access layer designed for low-power IoT applications utilizing short-lived UE connections. IoT devices may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, the IoT devices may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices can utilize technologies such as machine-to-machine (M2M) or machine-type communications (MTC) for exchanging data with an MTC server (e.g., a server 260), a MEC server 257 and/or MEC system, or device via a PLMN, ProSe or D2D communication, sensor networks, or IoT networks. The M2M or MTC exchange of data may be a machine-initiated exchange of data.

The IoT devices may execute background applications (e.g., keep-alive messages, status updates, etc.) to facilitate the connections of the IoT network. Where the IoT devices are, or are embedded in, sensor devices, the IoT network may be a WSN. An IoT network describes an interconnecting IoT UEs, such as the IoT devices being connected to one another over respective direct links 253. The IoT devices may include any number of different types of devices, grouped in various combinations (referred to as an "IoT group") that may include IoT devices that provide one or more services for a particular user, customer, organizations, etc. A service provider (e.g., an owner/operator of servers 260, cloud 258, edge node(s) 257, etc.) may deploy the IoT devices in the IoT group to a particular area (e.g., a geolocation, building, etc.) in order to provide the one or more services. In some implementations, the IoT network may be a mesh network of IoT devices, which may be termed a fog device, fog system, or fog, operating at the edge of the cloud 258. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 258 to Things (e.g., IoT devices). The fog may be established in accordance with specifications released by the OpenFog Consortium (OFC), the Open Connectivity Foundation™ (OCF), among others. In some embodiments, the fog may be a tangle as defined by the IOTA foundation.

The fog may be used to perform low-latency computation/aggregation on the data while routing it to an edge cloud computing service 257 and/or a central cloud computing service 258 for performing heavy computations or computationally burdensome tasks. On the other hand, edge cloud computing consolidates human-operated, voluntary resources, as a cloud. These voluntary resource may include, inter-alia, intermediate nodes and/or endpoint nodes such as desktop PCs, tablets, smartphones, nano data centers, and the like. In various implementations, resources in the edge cloud may be in one to two-hop proximity to the IoT devices, which may result in reducing overhead related to processing data and may reduce network delay.

In some embodiments, the fog may be a consolidation of IoT devices and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog may operate at the edge of the cloud 258. The fog operating at the edge of the cloud 258 may overlap or be subsumed into an edge network of the cloud 258. The edge network of the cloud 258 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the UEs 64, edge nodes 257, infrastructure equipment 61, RAN node 256, etc., of FIG. 1.

Data may be captured, stored/recorded, and communicated among the IoT devices that have direct links 253 with one another as shown by FIG. 2. Analysis of the traffic flow and control schemes may be implemented by aggregators that are in communication with the IoT devices and each other through a mesh network. The aggregators may be a type of IoT device, a specific type of network appliance(s), edge node(s) 257, and/or one or more designated intermediate nodes 64 and/or endpoint nodes 64. Data may be uploaded to the cloud 258 via the aggregator, and commands can be received from the cloud 258 through gateway devices that are in communication with the IoT devices and the aggregators through the mesh network. Unlike the traditional cloud computing model, in some implementations, the cloud 258 may have little or no computational capabilities and only serves as a repository for archiving data recorded and processed by the fog. In these implementations, the cloud 258 centralized data storage system and provides reliability and access to data by the computing resources in the fog and/or edge devices. Being at the core of the architecture, the Data Store of the cloud 258 is accessible by both Edge and Fog layers of the aforementioned edge-fog network.

Figure 3:
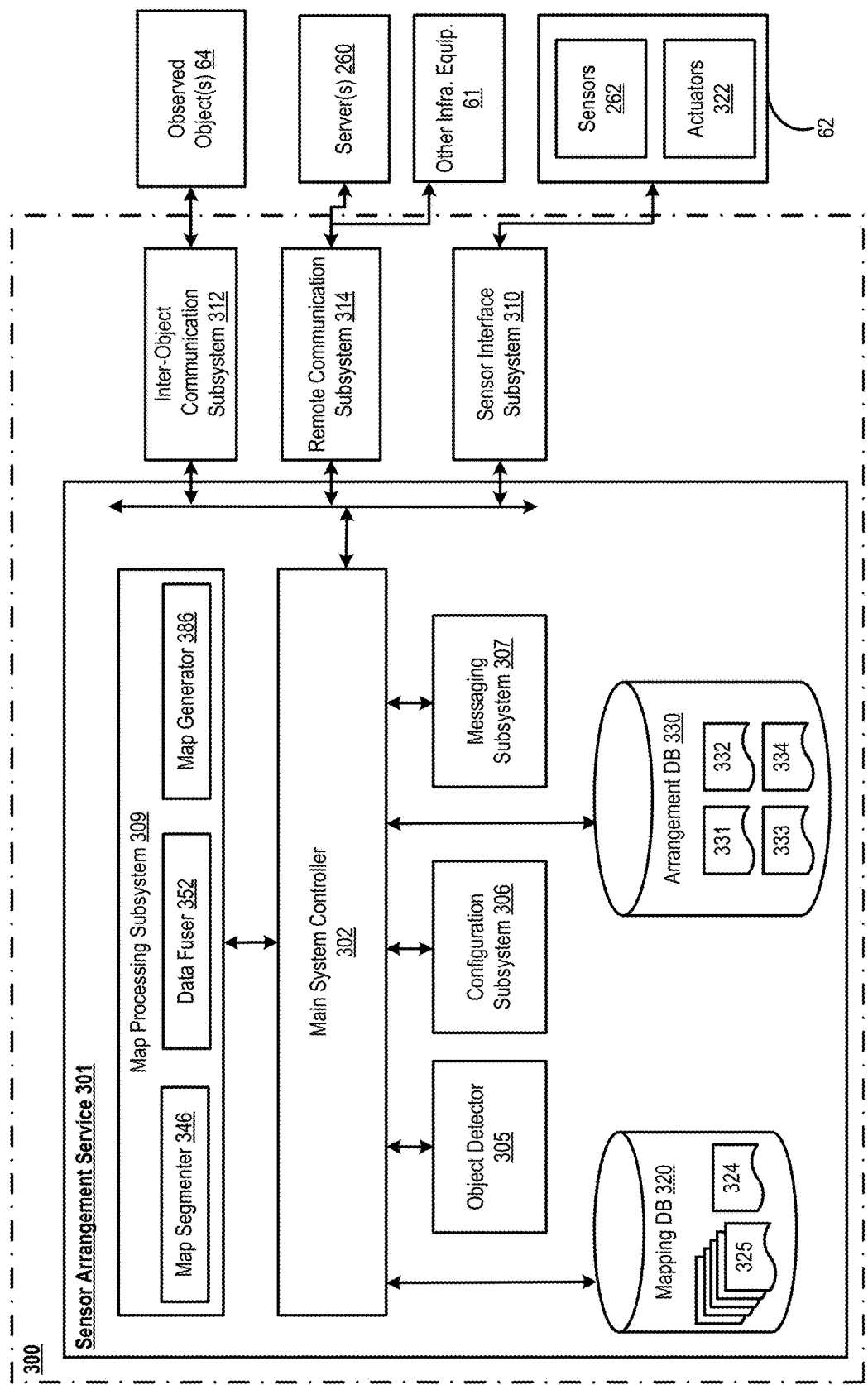
FIG. 3 illustrates a component view of a system for providing a sensor arrangement service according to various embodiments.

Referring now to FIG. 3, wherein a component view of an system 300 including a sensor arrangement service (SAS) 301, according to various embodiments, is illustrated. In some embodiments, the system 300 may be the infrastructure equipment 61a, 61b (hereinafter "infrastructure equipment 61"), RAN node 256, one or more edge node(s) 257, server(s) 260, or some other suitable system or device such as a special-purpose appliance or gateway device. In some embodiments, aspects of the system 300 and the SAS 301 may be distributed across infrastructure equipment 61, RAN node 256, one or more edge node(s) 257, server(s) 260, and/or some other suitable system or device. In other embodiments, some or all of the aspects of the SAS 301 may be hosted by a cloud computing service 258, which interacts with individual equipment 61 or one or more deployed edge node(s) 257, special-purpose appliances or gateways, or the like.

As shown, the system 300 includes the SAS 301, a sensor interface subsystem 310, inter-object communication subsystem 312, and remote communication subsystem 314. The SAS 301 includes main system controller 302, object detector 305, configuration subsystem 306, messaging subsystem 307, map processing subsystem 309, mapping database (DB) 320, and arrangement DB 330. The map processing subsystem 309 includes a map segmenter 346, a data fuser 352, and a map generator 386. In other embodiments, the SAS 301 and/or system 300 may include more or less subsystems than are shown by FIG. 3.

The main system controller 302 is configured to manage the SAS 301, such as by scheduling tasks for execution, managing memory/storage resource allocations, routing inputs/outputs to/from various entities, and the like. The main system controller 302 may schedule tasks according to a suitable scheduling algorithm, and/or may implement a suitable message passing scheme to allocate resources. In some embodiments, the main system controller 302 may operate an OS to allocate computing, memory/storage, and networking/signaling resources, such as those discussed herein. In some embodiments, the main system controller 302 is configured to facilitate intra-subsystem communication between the various subsystems of the SAS 301 using suitable drivers, libraries, APIs, middleware, software connectors, software glue, and/or the like. The main system controller 302 is also configured to control communication of application layer (or facilities layer) information with objects 64, such as sending/receiving requests/instructions and data (e.g., ACKs, position information, and sensor data), including functionality for encoding/decoding such messages.

The object detector 305 is configured to detect, monitor, and track object(s) 64 in a coverage area 63. The detecting, tracking, and monitoring of the observed object(s) 64 is based on sensor data received from sensors 262 of the sensor array 62 and/or from observed objects 64. The object detector 305 is configured to receive sensor data from sensors 262 with the assistance of sensor-interface subsystem 310, and in some embodiments, may receive sensor data held by one or more other infrastructure equipment 361 with the assistance of remote communication subsystem 314. According to various embodiments, the object detector 305 is also configured to receive sensor data held by observed objects 64 with the assistance of inter-object communication subsystem 312. As alluded to previously, what constitutes the coverage area 63 may be application dependent, limited by the sensing capabilities of the sensors 262, and varies from embodiment to embodiment. The object detector 305 may continuously track observed objects 64, and determine vector information (e.g., travel direction, travel velocity/speed, travel acceleration, etc.) about the observed objects 64. The object detector 305 may use one or more known object tracking and/or computer vision techniques to track the objects 64, such as a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., a convolutional neural network (CNN), fully CNN (FCNN), region proposal CNN (R-CNN), single shot multibox detector, 'you only look once' (YOLO) algorithm, etc.), and/or the like. Some of the aforementioned techniques use identifiers (referred to as "inherent IDs" or the like) to track detected objects 64 in video or similar sensor data. In these embodiments, the object detector 305 may store these inherent IDs in the arrangement DB 330. In addition to using sensor data, the object detector 305 may use other mechanisms to assist the detection and monitoring of the objects 64. For example, the object detector 305 may detect and track objects 64 using known received signal strength indication (RSSI) calculations of one or more signals generated by the observed objects 64, triangulation, and/or dead reckoning methods. In another example, the object detector 305 may utilize other information associated with the one or more signals for detecting and tracking objects 64, such as directional signaling measurements, path loss measurements, packet delay time, signal to noise ratio, signal to noise plus interference ratio, throughput measurements, jitter, latency, round trip time (RTT), number of interrupts, out-of-order delivery of data packets, and/or other like parameters.

The sensor interface subsystem 310 communicatively couples the infrastructure equipment 61 and the SAS 301 with the sensor array 62, and facilitates communication with sensors 262 and actuators 322 in the sensor array 62. In particular, sensor interface subsystem 310 is configured to receive data from sensors 262 and actuators 322, and transmit commands to sensors 262 and actuators 322 for operation/control of the sensors 262 and actuators 322. Example of commands to sensors 262 and actuators 322 may include, but are not limited to, calibration commands, commands to collect certain sensor/actuator data that are collected asynchronously or on demand (as opposed to being collected continuously or on a periodic basis), and/or commands to change a position or orientation of a particular sensor 262 and/or actuator 322. In some embodiments, sensor interface subsystem 310 is configured to support inter-device communication in accordance with one or more industry standards, such as cellular, WiFi, Ethernet, short-range communication or personal area network (PAN), a Controller Area Network (CAN), or some other suitable standard or combination(s) thereof, such as those discussed herein. In this example of FIG. 3, the sensor array 62 includes the sensors 262 and actuators 322. In some embodiments, such as when the system 300 is the infrastructure equipment 61, RAN node 256, or edge node 257, the sensor interface subsystem 310 includes various electrical/electronic elements to interconnect the system 300 with the sensors 262 and actuators 322 in the sensor array 62, such as controllers, cables/wires, plugs and/or receptacles, etc. In some embodiments, such as when the system 300 is a server 260, cloud 258 element, edge node 257, RAN node 256, of infrastructure 61, the sensor interface subsystem 310 may include wireless communication circuitry to wirelessly communicate with the sensors 262 and actuators 322 in the sensor array 62. In ITS implementations, the sensor interface subsystem 310 may be a roadside ITS-S gateway or a road equipment data gateway, which is a specific gateway to the road side equipment and interconnects components of the roadside system including sensors 262 in sensor arrays 62, traffic lights, gates or barriers, gantries, electronic signage, etc.

The one or more sensors 262 include devices that are configured to measure and/or detect state changes or motions in the coverage area 63, and provide sensor data representative of the detected/measured changes to the object detector 305 via the sensor interface subsystem 310 and the main system controller 302. In some embodiments, the sensors 262 include one or more motion capture devices that are configured to capture motion by detecting a change in position of an object 64 relative to its surroundings (e.g., one or more objects surrounding the object 64), by detecting a change in the surroundings relative to the object 64, and/or measure the strength and/or speed of the object 64's motion. The motion (or change in motion) as well as the speed and direction of the motion may be detected by reflection of visible light (or opacity), ultraviolet light, sound, microwaves, IR or near-IR waves, and/or some other suitable electromagnetic energy. The sensors 262 may include know electronic elements depending on the type of sensors 262 (e.g., radar, LiDAR, visible or UV light cameras, thermographic (e.g., IR) cameras, etc.), for example, transmitters, waveguides, duplexers, receivers (e.g., radar signal receiver, photodetectors, or the like), MEMS devices, scanners, beam splitters, signal processors or DSPs, energy sources (e.g., illumination sources, laser projectors, IR projectors, etc.), antenna arrays including individual antenna elements, and/or other like elements as are known. Other types of sensors 262 may be used in other embodiments.

The actuators 322 are devices that are responsible for moving and controlling a mechanism or system. In various embodiments, the actuators 322 are used to change the operational state (e.g., on/off, zoom or focus, etc.), position, and/or orientation of the sensors 262. In some embodiments, the actuators 322 are used to change the operational state of some other roadside equipment, such as gates, traffic lights, digital signage, etc. The actuators 322 are configured to receive control signals from the SAS 301 via the sensor interface subsystem 310, and convert the signal energy (or some other energy) into an electrical and/or mechanical motion. The control signals may be relatively low energy electric voltage or current. In embodiments, the actuators 322 comprise electromechanical relays and/or solid state relays, which are configured to switch electronic devices on/off and/or control motors.

Continuing with the example of FIG. 3, the configuration subsystem 306 facilitates deployment and (re)configuration of an arrangement of the sensors 626 with the assistance of sensor interface subsystem 310, which may include using one or more communication protocols as discussed herein. The terms "configuration" and "reconfiguration" as used herein may refer to mechanisms that change the sensing or detection sectors of sensors 262, while basic sensing functionalities remain unchanged. In some embodiments, the "configuration" and "reconfiguration" may include placement (deployment) of access points, RAN nodes, gateway devices, etc., or at least take into account already deployed access points, RAN nodes, gateway devices, etc. The (re) configuration includes, but is not limited to, the configuration subsystem 306 sending commands or instructions, with the assistance of sensor interface subsystem 310, to adapt or adjust sensing parameters such as a viewing area (e.g., opening angle, focus, zoom, scaling, beam forming, sensing element aperture size/shape, etc.), orientation (e.g., sensing element tilt, azimuth, etc.), and/or sensing range (e.g., on/off state, power and/or energy levels, etc.). The actuators 322 may reconfigure sensor 262 orientations by a mechanical rotation about an axis on which the sensors 262 are disposed, and may reconfigure sensor 262 positions by mechanical movement. The reconfiguration procedure performed by the configuration subsystem 306 shifts the focus of attention of a set of sensors 262 to new areas of interest and/or to mitigate perception gaps caused by sensor failures, temporary obstacles, and the like. The particular manner in which a sensor 262 arrangement is adjusted, and the details on dealing with sensor coverage issues and mitigation options may vary from embodiment to embodiment, and may depend on the particular sensor and actuation technologies being used as well as the capabilities and limitations of the particular sensors 262 and actuators 322 being used. As discussed in more detail infra, the configuration subsystem 306 may adjust or alter sensing parameters of one or more sensors 262 within a single sensor array 62 or sensing parameters of sensors 262 within multiple sensor arrays 62. In some embodiments, the system 300 may alert a separate subsystem or remote system about the adjustment or altered sensor 262 arrangement.

For both the initial placement and dynamic reconfiguration, the configuration subsystem 306 may take into account additional optimization constraints or policy considerations. These constraints and/or considerations may include, but are not limited to, predefined areas where sensor placement is forbidden; (semi-)opaque obstacles for sensors 262; areas that require multi-coverage at specific times by sensors 262 of the same or different types; statistical traffic patterns (e.g., lane closures, trucks that are usually found on the right-most lane and are likely to cause temporary occlusions), sensor density for a given area of interest, and/or the like. These policies and/or defined constraints may be stored as records 334 in the arrangement DB 330. In some embodiments, the constraints and/or considerations may include costs and benefits in environments of denser sensor and access point configurations and how additional features are enabled.

The configuration subsystem 306 also plays a role in managing storage of various records 331-334 in the arrangement DB 330. As mentioned previously, the object detector 305 uses an optimization algorithm, such as a genetic algorithm or evolutionary algorithm, to (re)configure sensor 262 arrangements. In these embodiments, the configuration subsystem 306 may store the generated sensor arrangements/configurations in association with an index or unique IDs in records 331 (also referred to as "configurations 331," "sensor arrangements 331," or the like). Additionally, the arrangement DB 330 may also store sensor information and/or sensor capabilities in records 332 (also referred to as "capabilities records 332," "sensor capabilities 332," or the like). The sensor information and/or capabilities may be obtained during an initial setup procedure, such as when a new sensor 262 or network element is deployed to the coverage area 63. The sensor capabilities include, but are not limited to, sensor type (e.g., radar, LiDAR, IR, visible light cameras, etc.), sensing/readings ranges and precision of the sensors 262, movement and/or orientation capabilities, geo-location or deployment area of a sensor 262, geo-positioning capabilities indicating any type of positioning or localization systems are implemented by the sensors 262 (if any), communication capabilities indicating the types of communication circuitry implemented by the sensors 262, and/or other like information. The arrangement DB 330 may also store sensor data and/or object data (e.g., velocity/speed, position, direction, size, sensor data etc.) obtained from sensors 262 and/or objects 64 in records 333.

Furthermore, the arrangement DB 330 stores records 334 indicating policies for (re)configuring the sensor arrangement. The policies 334 (also referred to as "metadata 334", "profiles 334", "manifests 334", or the like) define a set of rules that govern the behavior of the SAS 301, and in particular, the configuration subsystem 306, when analyzing current sensor 262 arrangements as well as behaviors for reconfiguring the sensor 262 arrangement. For example, one or more of the policies 334 may define criteria to be used by the configuration subsystem 306 or the sensor interface subsystem 310 for determining whether or not a sensor 262 should be declared a faulty, malfunctioning, or failed sensor 262. In another example, one or more of the policies 334 may define criteria to be used by the configuration subsystem 306 for determining which type of data to prioritize when determining new/different sensor 262 arrangements.

The various criteria of the policies 334 may include, for example, algorithms, weight factors for individual pieces of data, analysis techniques/functions, system rules, policy definitions, ML models/algorithms, etc. In some embodiments, the documents or data structures making up the policies 334 may comprise a "description," or a suitable collection of software modules, program code, logic blocks, parameters, rules, conditions, etc. that may be used by one or more subsystems of the system 300 to control and/or monitor the sensors 262 and/or actuators 322, as well as share data with various resource. For example, the policies 334 may include executable code, which can include program code, software modules, computational logic, etc., which when operated by the configuration subsystem 306, analyzes sensor data and/or the current sensor 262 arrangement for generating new sensor 262 arrangements. In some embodiments, the policies 334 may define one or more actions and conditions under which the actions are executed. For example, one or more policies 334 defines one or more actions that the configuration subsystem 306 is to take when a new sensor 262 or sensor array 62 is added to, or removed from, the system 300. In these embodiments, the policies 334 may include the necessary instructions or commands for operating the configuration subsystem 306, sensors 262, actuators 322, or the like. In some embodiments, the policies 334 may define permissions for sharing sensor data with remote servers 260, or otherwise granting access to the system 300, which may be based on permissions set for different trust levels and/or capabilities of the system 300.

The policies 334 may be formed of any of the programming languages, markup languages, schema languages, etc. discussed herein. In some embodiments, the policies 334 comprise documents or data structures in a format that can be interpreted by the subsystems of energy management system 300, such as XML (or any variation thereof), JSON, markdown (or any variation thereof), IFTTT ("If This Then That"), PADS markup language (PADS/ML), routing policy language (RPL), Click router configuration language, Nettle, and/or some other suitable data format, such as those discussed herein. The documents or data structures that make up the policies 334 may be developed or defined by an owner/operator of the system 300. In one example, a developer may write the policies 334 using a suitable development tool/environment and/or in any combination of one or more programming languages, such as those discussed herein. In another example, the policies 334 may be generated by an application implemented by the servers 260 based on various selections within a user interface or the like. In these examples, the policies 334 may be provisioned or otherwise loaded into the SAS 301 or arrangement DB 330, with the assistance of the remote communication subsystem 314 and main system controller 302, so that these documents may be utilized by the other subsystems of the SAS 301. New or updated versions of the policies 334 may be provisioned or loaded to the SAS 301 synchronously (e.g., where the main system controller 302 periodically polls the remote server(s) 260 for updates) or asynchronously (e.g., where the remote server(s) 260 push updated or new policies 334 to the SAS 301 when created or when instructed by the owner/operator of the system 300).

Continuing with the example of FIG. 3, the map processing subsystem 309 includes a map segmenter 346, data fuser 352, and map generator 386. The data fuser 352 performs various logical operations for fusing or otherwise combining the collected sensor data together. The data fuser 352 includes technology to combine sensor data obtained from the sensors 262, as well as sensors mounted in/on one or more objects 64. The sensor data may be fused using any suitable technique (e.g., a combination of Kalman filters, Gaussian Mixture Model, etc.). The data fuser 352 may also include technology to perform sensor detection and/or data collection and may combine/process the data to prepare the data for map generation. Sensor data fusion may also involve time synchronization using information about location, direction, speed, and size of each object 64 as identified by the object detector 305.

The map processing subsystem 309 also includes a map generator 386 to perform various logical operations for generating an overall map of the coverage area 63. The map generator 386 includes technology to generate an environmental map 324 (or "environment model 324") of the coverage area 63 based on the combined sensor data from the data fuser 352, and to control storage of the map/model 324 in the mapping DB 320. In ITS implementations, the mapping DB 320 may correspond to an LDM repository. In some embodiments, the map/model of the coverage area 63 may include a grid and/or a plurality of cells. Any suitable technology may be used to generate the overall map/model of the coverage area 63. Information about the coverage area 63, including information about moving objects 64, may be extracted and combined to one overall map/model including all static (non-moving) objects and moving objects 64 in the coverage area 63 that are in the detection range of the sensors 262. The result may be represented as an overall map/model of the coverage area 63. In some embodiments, the object detector 305 may use the relative movement between objects 64 and the sensors 262 to help remove sensor blind spots, which may be based on the constantly changing viewing angles of objects 64 as those objects 64 pass by the stationary sensors 262. Some embodiments may attempt to achieve as complete as possible/practical coverage by combining different sensor types, sensor positions, and sensing directions. In embodiments, the arrangement of sensors 262 may be reconfigured taking into account different sensor types, sensor positions, and sensing directions.

The map processing subsystem 309 also includes a map segmenter 346, which includes technology to divide the environmental map/model 324 from the map generator 386 into two or more map segments 325. The map segmenter 346 is configured to annotate the two or more map segments 325 with information for one or more objects 64 to construct respective individualized environmental maps. For example, the map segmenter 346 may assign a unique identifier to each of the two or more map segments 325 corresponding to a location in the environmental map 324. The map segmenter 346 may be further configured to cluster the one or more objects 64 into the two or more map segments 325 based on respective locations of the one or more objects 64 and respective locations of the two or more segments in the environmental map 324.

Some embodiments may advantageously provide a fog/edge infrastructure-aided dynamic mapping for autonomous driving and manufacturing (e.g., automated warehouses). For example, some embodiments may provide a platform to serve individualized maps of highly dynamic data for driving decisions in CA/AD or AV vehicles 64. As used herein, autonomous may refer to either fully autonomous or partially autonomous. Some embodiments may provide unique labeling of objects 64 identified by infrastructural sensors 262, map segment tagging, and/or remote updates, together with a low overhead handshake protocol between the infrastructure equipment 61 and the objects 64 as discussed in co-pending U.S. application Ser. No. 16/234,260 titled "SENSOR NETWORK ENHANCEMENT MECHANISMS," filed on Dec. 27, 2018, which is hereby incorporated by reference in its entirety for all purposes. Real-time mapping of a highly dynamic environment may be important for high-reliability decision making systems. In the assisted/autonomous driving sector, for example, in-vehicle processing alone may be insufficient to form a sufficient or complete real-time object-detection and tracking map of the surrounding area. Some embodiments may advantageously provide an infrastructure equipment 61 (e.g., a roadside system) to augment in-vehicle processing for more complete map generation and object tracking. In various embodiments, the fog/edge infrastructure-aided dynamic mapping may be used for the (re)configuration of sensors 262 arrangements based on various trigger events or conditions.

Continuing with the example of FIG. 3, the inter-object communication subsystem 312 is configured to facilitate communication with observed objects 64. In particular, inter-object communication subsystem 312 is configured to receive data from observed objects 64, and broadcasts or multicasts messages to the observed objects 64 to perform handshakes and/or request data from observed objects 64. The inter-object communication subsystem 312 is configured to support communication between the infrastructure equipment 61 and the observed objects 64 in accordance with one or more industry standards, such as cellular specifications provided by the 3GPP NR and/or LTE standards, a LAN or WAN standard such as WiFi specified by a suitable IEEE 802.11 standard, a short-range communication standard such as Bluetooth/BLE, ZigBee, Z-Wave or the like, or some other suitable standard or combination(s) thereof, such as those discussed herein. For some of these embodiments, the object detector 305 and/or other subsystems of the SAS 301 are further configured, with the assistance of inter-object communication subsystem 312, to scan and discover whether the observed objects 64 support a particular inter-device communication industry standard. For WiFi implementations (e.g., DSRC and/or IEEE 802.11p), the scan could include, for example, performing energy detection (ED) during a listen-before-talk (LBT) operation to detect an unoccupied channel. For C-V2X implementations, the scan/discovery could include, for example, requesting V2X (or ProSe) capabilities and/or permissions directly from the objects 64 themselves or from a V2X control and management function (or ProSe Function) located in a core network. Further, main system controller 302, object detector 305, or some other subsystem may be configured, with the assistance of inter-object communication subsystem 312, to authenticate the observed objects 64, confirming that some or all of the observed objects 64 include suitable communications and autonomic capabilities. Upon authentication of the other observed objects 64, the main system controller 302 may control the inter-object communication subsystem 312 to exchange authentication information, including identification and/or security information. In some embodiments, this information may be exchanged in a secure manner, in accordance with a security protocol specified by the mutually supported communication standard. For example, the authentication information may be encrypted prior to transmission to the observed objects 64 or the like.

According to various embodiments, the messaging subsystem 307, with the assistance of the inter-object communication subsystem 312, broadcasts or multicasts messages to request data from the objects 64. In these embodiments, the messaging subsystem 307 is configured to generate and encode the messages for broadcast/multicast, and decode messages that are received from individual observed objects 64. These messages may include a set of attributes and/or data elements (DEs) that are required for reliable navigation decisions including, but are not limited to, assigned unique ID, position (e.g., GNSS geolocation), direction, speed, vehicle size, vehicle type, map segment data, sensor attributes, and/or the like. The messages may be formed or generated using any suitable markup language, schema language, data interface language, etc. that can be interpreted by the subsystems of SAS 301, such as XML (or any variation thereof), JSON, markdown (or any variation thereof), IFTTT, PADS/ML, RPL, Click router configuration language, Nettle, and/or some other suitable data format, such as those discussed herein.

As alluded to earlier, remote communication subsystem 314 is configured to facilitate communication with one or more remote servers 360 and/or other infrastructure equipment 61. The remote servers 360 may be the same or similar as the server(s) 260 of FIG. 2, and may be one or more servers affiliated with a mobile network operator, a service provider platform, cloud computing service, traffic management service, energy management service, an insurance company, emergency response services (e.g., first responders, fire, ambulance, etc.), a law enforcement or governmental agency, an environmental data service, and so forth. The other infrastructure equipment 361 may be the same or similar as the infrastructure equipment 61 (with associated sensor arrays 62, etc.) that is deployed at a different geographic location than the infrastructure equipment 61. The remote communication subsystem 314 is configured to support communication between the infrastructure equipment 61, servers 340 and other infrastructure equipment 361 in accordance with one or more industry standards, such as cellular specifications such as 3GPP NR and/or LTE standards, or WiMAX standards; a LAN, WAN, or WLAN standard such as WiFi specified by a suitable IEEE 802.11 standard or Ethernet specified by a suitable IEEE 802.3 standard, or some other suitable standard or combination(s) thereof, such as those discussed herein.

According to various embodiments, one or more subsystems of the SAS 301 detects a trigger to reconfigure the arrangement of sensors 262. In one example, the map processing subsystem 309 identifies and/or selects one or more sections or regions of the coverage area 63 (e.g., one or more logical grid cells of the environmental model) that includes a perception gap, which may be based on a failure of a sensor 262, a detected occlusion, or the like. The map processing subsystem 309 uses known mechanisms to detect occlusions of the fixed sensors 262 or other reasons that reduce the completeness of environmental map 324, and selects sections or regions (e.g., grid cells) that correspond to the occluded area. In this example, the map processing subsystem 309 sends a trigger to the configuration subsystem 306 indicating the selected sections or regions of the coverage area 63. In another example, the object detector 305 may detect an occlusion, for example, when a tracked object 64 moves into the LoS of a sensor 262 for a predetermined or predefined period of time. In this example, the object detector 305 sends a trigger to the configuration subsystem 306 indicating the occlusion and/or the sensor 262 that is being occluded or blocked. In another example, the sensor interface subsystem 310 may detect malfunction or failure of one or more sensors 262, and may send a trigger to the configuration subsystem 306 indicating the malfunctioning or failed sensor(s) 262. In another example, the system 300 may obtain an instruction to reconfigure the sensor 262 arrangement from, for example, a remote server 260. The instruction may simply indicate that the sensor 262 arrangement should be reconfigured, or may include one or more parameters that the configuration subsystem 306 should use when optimizing the orientations and/or positions of the sensors 262. In this example, the instruction from the server 260 may be a trigger that is provided to the configuration subsystem 306 via the remote communication subsystem 314.

In response to detection of the trigger, the configuration subsystem 306 may load, with the assistance of the main system controller 302, the sensor arrangement data 331, sensor capabilities, 332, sensor data 333, and policies 334 from the arrangement DB 330, and may uses this data to generate a new sensor 262 arrangement. In some embodiments, the configuration subsystem 306 may use information included with the trigger message (e.g., trigger payload) when generating the new sensor arrangement 262. Examples of how the configuration subsystem 306 generates a new sensor 262 arrangement is discussed in more detail infra with respect to FIGS. 4-8.

In ITS-based implementations, some or all of the components depicted by FIG. 3 may follow the ITS communication (ITSC) protocol, which is based on the principles of the OSI model for layered communication protocols extended for ITS applications. The ITSC includes, inter alia, For example, an access layer (which corresponds with the OSI layers 1 and 2), a networking & transport (N&T) layer (which corresponds with OSI layers 3 and 4), a facilities layer (which corresponds with OSI layers 5, 6, and at least some functionality of OSI layer 7), and an applications layer (which corresponds with some or all of OSI layer 7). Each of these layers are interconnected via respective interfaces, service access points (SAPs), and/or APIs. In such implementations, some or all of the SAS 301 may be part of the facilities layer, and aspects of the sensor interface subsystem 310, the inter-object communication subsystem 312, and the remote communication subsystem 314 may be part of the N&T and access layers.

The facilities layer is middleware, software connectors, software glue, etc. comprising multiple facilities. In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the applications layer and exchanges data with lower layers for communicating that data with other ITS-Ss. A list of the common facilities is given by table 1 and a list of the domain facilities is given by table 2.

TABLE 1

Common Facilities

| Classification | Facility name | Description |
| --- | --- | --- |
| Management | Traffic class management | Manage assignment of traffic class value for the higher layer messages |
| | ID management | Manage ITS-S identifiers used by the application and the facilities layer. |
| | Application ID (AID) management | Manage the AID used by the application and the facilities layer. |
| | Security access | Deal with the data exchanged between the application and facilities layer with the security entity. |

TABLE 1-continued

| | Common Facilities | |
|---|---|---|
| Classification | Facility name | Description |
| Application Support | HMI support | Support the data exchanges between the applications and Human Machine Interface (HMI) devices. |
| | Time service | Provide time information and time synchronization service within the ITS-S. This may include providing/obtaining the actual time and time stamping of data. |
| | Application/facilities status management | Manage and monitor the functioning of active applications and facilities within the ITS-S and the configuration. |
| | SAM processing | Support the service management of the management layer for the transmission and receiving of the service announcement message (SAM). |
| Information Support | Station type/capabilities | Manage the ITS-S type and capabilities information. |
| | positioning service | Calculate the real time ITS-S position and provides the information to the facilities and applications layers. The ITS-S position may be geographical position (longitude, latitude, altitude) of the ITS-S. |
| | Location referencing | Calculate the location referencing information and provide the location referencing data to the applications/facilities layer. |
| | Common data dictionary | Data dictionary for messages. |
| | Data presentation | Message encoding/decoding support according to formal language being used (e.g., ASN.1); supports the basic functionality of the OSI presentation layer. |
| Communication Support | Addressing mode | Select addressing mode for messages transmission |
| | Congestion control | Facilities layer decentralized congestion control functionalities. |

TABLE 2

| | Domain Facilities | |
|---|---|---|
| Classification | Facility name | Description |
| Application Support | DEN basic service | Support the protocol processing of the Decentralized Environmental Notification Message |
| | CA basic service | Support the protocol processing of the Cooperative Awareness Message |
| | EFCD | Aggregation of CAM/DENM data at the road side IT S-S and provide to the central ITS-S |
| | Billing and payment | Provide service access to billing and payment service provider |
| | SPAT basic service | Support the protocol processing of the Signal Phase and Timing (SPAT) Message |
| | TOPO basic service | Support the protocol processing of the Road Topology (TOPO) Message |
| | IVS basic service | Support the protocol processing of the In Vehicle Signage (IVS) Message |
| | Community service user management | Manage the user information of a service community |
| Information Support | Local dynamic map | Local Dynamic Map database and management of the database |
| | RSU management and communication | Manage the RSUs from the central ITS-S and communication between the central ITS-S and road side ITS. |
| | Map service | Provide map matching functionality |
| Communication Support | Session support | Support session establishment, maintenance and closure |
| | Web service support | High layer protocol for web connection, SOA application protocol support |

TABLE 2-continued

Domain Facilities

| Classification | Facility name | Description |
| --- | --- | --- |
| | Messaging support | Manage ITS services messages based on message priority and client services/use case requirements |
| | E2E Geocasting | Deal with the disseminating of information to ITS vehicular and personal ITS stations based on their presence in a specified Geographical area |

In one example ITS implementation, the messaging subsystem 307 and the inter-object communication subsystem 312 may provide DEN basic service (DEN-BS) and/or CA basic service (CA-BS) facilities, the mapping DB 320 may provide the LDM facility, and the map processing subsystem 309 may be an ITS application residing in the application layer. In this example, the map processing subsystem 309 may be classified as a road safety application and/or a traffic efficiency application. Furthermore, aspects of the configuration subsystem 306 and/or the arrangement DB 330 may provide the station type/capabilities facility in this example ITS implementation.

For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or data frames (DFs) included in the ITS data dictionary as defined by ETSI technical specification (TS) 102 894-2 version 1.3.1 (2018-08), titled "Intelligent Transport System (ITS) Users and application requirements; Part 2: Applications and facilities layer common data dictionary."

The station type/capabilities facility may be used for aspects of the arrangement DB 330 and/or the configuration subsystem 306. The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). In this example ITS implementation, the station type/capabilities facility may store, in the arrangement DB 330, the sensor capabilities 332 of the sensors 262 and the sensor data 333 obtained from the sensors 262.

As mentioned previously, aspects of the sensor interface subsystem 310, the inter-object communication subsystem 312, and the remote communication subsystem 314 may be part of the N&T and access layers. The N&T layer provides functionality of the OSI network layer and the OSI transport layer and includes one or more networking protocols, one or more transport protocols, and network and transport layer management. The networking protocols may include, inter alia, the Internet Protocol version 4 (IPv4), Internet Protocol version 6 (IPv6), the GeoNetworking protocol, IPv6 networking with mobility support, IPv6 over GeoNetworking, the CALM FAST protocol, and/or any other suitable networking protocol. It should be appreciated that the IPv6 networking protocol comprises methods to enable interoperability with legacy IPv4 systems. The transport protocols may include, inter alia, UDP/TCP, one or more dedicated ITSC transport protocols, or some other suitable transport protocol. Each of the networking protocols may be connected to a corresponding transport protocol. The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology and protocol such as ITS-G5, DSRC, WiFi, GPRS, UMTS, 3GPP 5G, Ethernet, Bluetooth, or any other protocol discussed herein. The CIs provide the functionality of one or more logical channels (LCHs), where the mapping of LCHs on to physical channels is specified by the standard of the particular access technology involved.

Still referring to FIG. 3, each of the subsystems of SAS 301, sensor interface subsystem 310, inter-object communication subsystem 312, and remote communication subsystem 314 may be implemented in hardware, software, or combination thereof. Example hardware implementations may include individual companion silicon or circuitry, including, but not limited to, configurable logic such as, for example, FPGAs, PLDs/CPLDs/HCPLDs, programmable SoCs programmed with the operational logic, or fixed-functionality logic hardware using circuit technology such as, for example, ASIC, CMOS, or TTL technology, or any combination thereof. Software implementations may include implementations where the components shown by FIG. 3 are individual autonomous software agents and/or AI agents developed using a suitable programming language, development tools/environments, etc., which are executed by one or more processors or individual hardware accelerators that are configured with appropriate bit stream(s) or logic blocks to perform their respective functions. Software implementations may additionally or alternatively include implementations in instructions of instruction set architectures (ISA) supported by target processors, or any one of a number of high level programming languages that can be compiled into instruction of the ISA of the target processors. In either software or hardware implementations, especially those embodiments where either controller 302 and/or one of the subsystems of the SAS 301 includes at least one (trained) neural network in performing their respective determinations and/or assessments, at least a portion of main system controller 302 and the subsystems of the SAS 301 may be implemented in a hardware accelerator (e.g., an FPGA configured with an appropriate bitstream). As examples, the (trained) neural networks may be a multilayer feedforward neural network (FNN), Convolution Neural Network (CNN), Recurrent Neural Network (RNN), and/or some other suitable neural network. An example hardware computing platform of the infrastructure equipment 61 will be further described later with references to FIG. 9.

Example use cases of the embodiments discussed herein may involve enterprise environments (or vertical domains) such as smart rail-bound mass transit, smart cities, smart retail stores, smart warehouses, smart factories (a.k.a. factories of the future, Industry 4.0, etc.), building automation, electric power distribution and power generation, smart agriculture, and other like vertical domains. A "vertical domain" is a particular industry or group of enterprises in which similar products or services are developed, produced, and provided. In these example use cases, automation is used as a means for the control of processes, devices, and/or systems in vertical domains by automatic means. A "process" in this context includes physical entities and their attributes. A particular output is produced by providing particular input(s) to a process. The objective of automation is accomplished by the use of control systems. A "control system" is an interconnection of components forming a system configuration that will provide a desired process response. The control system includes four main control functions including: measurement, which involves obtaining values from sensors (e.g., sensors 262) and feeding these values as input to a process and/or provide these values as output, for instance to a computing system for reconfiguring the sensor arrangement of a sensor network according to the embodiments discussed herein; comparison, which involves evaluating measured values and comparing the measured values to process design values; calculation, which involves calculating, for instance, current error, historic error, future error, as well as calculating new positions and/or orientations of sensors 262 for a new sensor arrangement according to the embodiments discussed herein; and correction or control, which involves adjusting the process, such as sending instructions to infrastructure equipment 61 and/or sensor arrays 62 to adjust positions and/or orientations of sensors 262. The four functions above are typically performed by four elements, including sensors (e.g., sensors 262), which are devices capable of measuring various physical properties; transmitters, which are devices that convert measurements from a sensor (e.g., sensors 262) and sends a signal (e.g., inter-object communication subsystem 312 and/or remote communication subsystem 314); controller, which is a device that provides the logic and control instructions for the process (e.g., main system controller 302); and actuator (s), which are devices that change the state of the environment and/or the process (e.g., actuators 322).

One example use case mentioned previously includes building automation. Building automation refers to the management of equipment in buildings such as heaters, coolers, and ventilators. Automation of such systems brings several benefits, including the reduction of energy consumption, the improvement of comfort level for people using the building, and the handling of failure and emergency situations. Sensors installed in a building perform measurements of the environment and report these measurements to local controllers (LCs), and the LCs, in turn, report these results to a Building Management System (BMS). In this example, the main system controller 302 may be the LC(s) and the edge node 257 or remote server(s) 260 of FIG. 2 may be or may implement the BMS. In this example, the BMS may determine new sensor orientations in the building based on detecting failed or malfunctioning sensors, and may instruct the LCs to reconfigure the orientations of the sensors to fill-in building-based perception gaps.

Another example use case mentioned previously includes smart factories or industry 4.0. Factory automation deals with the automated control, monitoring, and optimization of processes and workflows within a factory or other like manufacturing facilities. This includes aspects like closed-loop control applications (e.g., based on programmable logic or motion controllers), robotics, as well as aspects of computer-integrated manufacturing. In Factories of the Future, static sequential production systems will be more and more replaced by novel modular production systems offering a high flexibility and versatility. This involves a large number of increasingly mobile production assets, for which powerful wireless communication and localization services are required. In these cases, sensors may be deployed at various locations in the factory to monitor modular production systems and/or mobile production assets. Sensors may also be deployed to monitor factory conditions in order to issue safety warnings or plant or machine shut downs. In some cases, such as process automation for the control of production and handling of substances like chemicals, food, beverage, etc., sensors are deployed throughout a manufacturing plant to measure various process values, such as pressure, temperature, liquid levels (e.g., in tanks or containers), etc., and work in a closed loop via centralized and decentralized controllers with actuators (e.g., valves, pumps, heaters, etc.). Sensor arrangements may also be used for monitoring and maintenance of smart factories, smart warehouses, and/or smart retail stores, which involves the monitoring of certain processes and/or assets without an immediate impact on the processes themselves (in contrast to a typical closed-loop control system in factory automation, for example). This particularly includes applications such as condition monitoring and predictive maintenance based on sensor data, but also big data analytics for optimizing future parameter sets of a certain process. For monitoring and maintenance use cases, the data acquisition process is typically not latency-critical, but a large number of sensors may have to be efficiently interconnected, especially since many of these sensors may be battery-driven. Any of these smart factory sensor networks may utilize the sensor arrangement (re) configuration embodiments discussed herein in order to fill-in perception gaps caused by sensor malfunctions or failures, occlusions, or the like.

Another example use case mentioned previously includes smart agriculture (or smart farming), which involves the application of data gathering (e.g., edge intelligence), data processing, data analysis and automation technologies within the overall agriculture value chain. This includes using IoT technology to make smarter decisions which may lead to reduce farming costs, and boost production. In one smart agriculture example, sensors 262 may be deployed around a farm to monitor (semi-)automated tractors 64 according to the embodiments discussed herein, and arrangements of these sensors 262 may be reconfigured according to the embodiments discussed herein. Another aspect of smart agriculture involves automated irrigation systems including actuators (e.g., valves) and sensors deployed around the farmland to monitor agricultural production values, which are centrally controlled and managed by an information management system. In this example, a farmer deploys a number of sensors in or around their farm for detecting air humidity, temperature and soil moisture. The sensors collect data on a regular basis (predefined by farmer), or until certain triggering conditions are met. The data collected are sent to an information management system via a secured connection, and the information management system controls valves of an irrigation system to water crops when sensor data detects low soil moisture levels and/or low air humidity until the sensor data indicates soil moisture levels and/or air humidity at or above some preconfigured threshold. These sensor networks may utilize the sensor arrangement (re)configuration embodiments discussed herein in order to redeploy sensors to different areas of a farm to fill-in perception gaps caused by sensor malfunctions or failures or the like.

Figure 4:
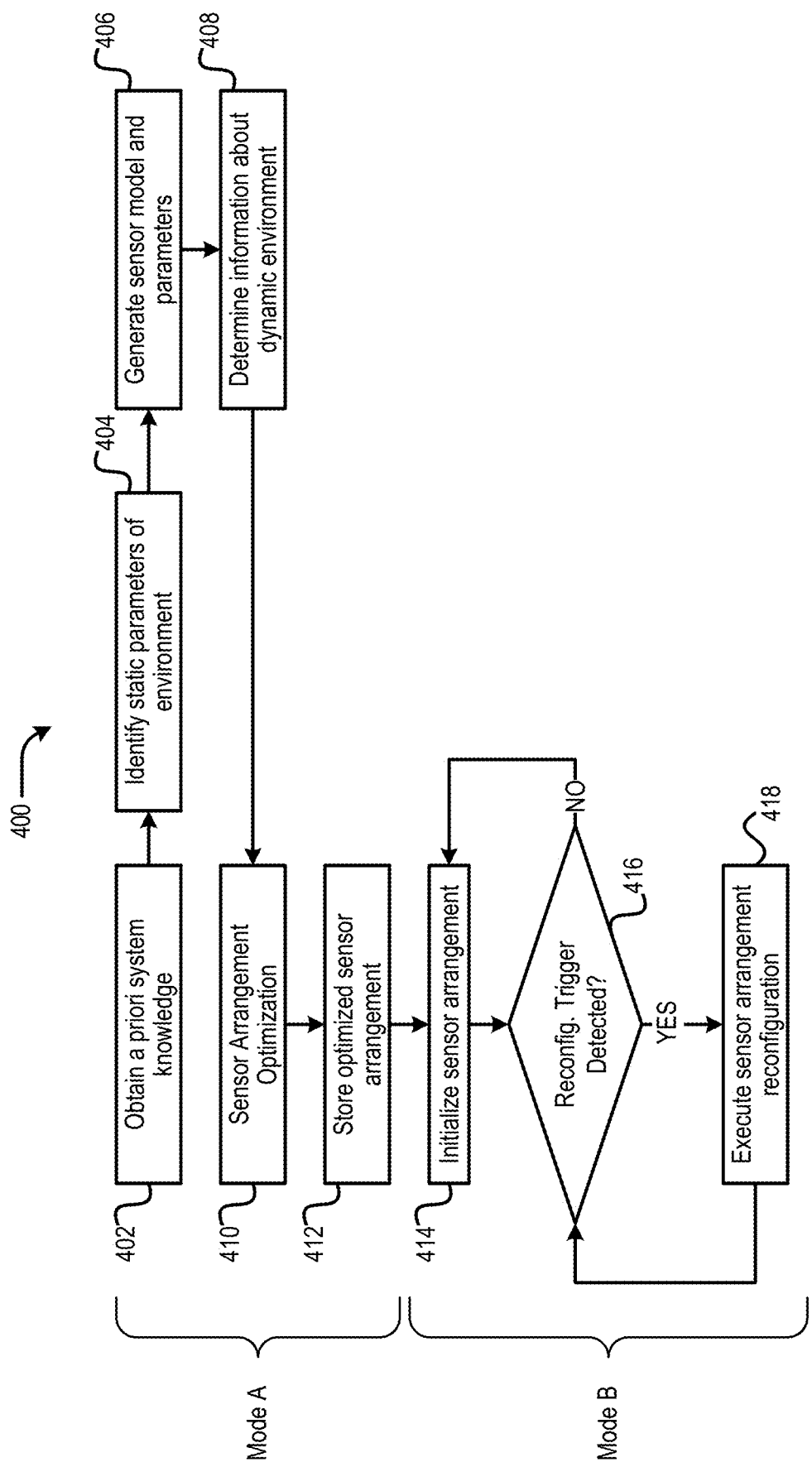
FIG. 4 shows an example sensor arrangement process according to various embodiments.

FIG. 4 shows an example sensor arrangement process 400 in accordance with various embodiments. For illustrative purposes, the various operations of process 400 is described as being performed by the SAS 301 and/or various subsystems of the SAS 301 of FIG. 3. While particular examples and orders of operations are illustrated FIG. 4, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

The sensor arrangement process 400 of FIG. 4 may be used to configure and reconfigure an arrangement of sensors 262. As shown by FIG. 4, the process 400 includes two modes of operation, mode A and mode B. Mode A involves creating an optimal initial configuration for sensor 262 positions and orientations and includes operations 402-412. In mode A, the process 400 attempts to find an optimal placement of the infrastructure sensors 262 in terms of position and orientation in a 2D or 3D grid environment model, while anticipating the need for dynamic sensor arrangement reconfiguration at a later point in time. Mode B involves dynamic reconfiguration of the sensor 262 positions and orientations and includes operations 414-418. In mode B, an optimization algorithm of the same or different form as used in mode A is used to find optimal positions and orientations of a sensor arrangement given a fixed number of sensors 262 and the existence of dynamic condition(s). This way the sensor network can reconfigure quickly in cases where, for example, individual sensors 262 malfunction or fail, are temporarily occluded, or if the coverage area 63 changes (e.g., construction site, traffic accident). In practice, a change of the sensor arrangement can be performed by physically rotating a sensor, by beam-steering techniques (e.g., in the case of radar sensors), or using other like mechanisms, such as those discussed herein.

Process 400 begins in mode A at operation 402 where the SAS 301 (or configuration subsystem 306) determines or generates an overall system representation (also referred to as an "environment model" or the like), and/or obtains a priori knowledge about the overall system 300 including, identifying or determining a definition of the static environment under observation (e.g., coverage area 63) at operation 404; generating or determining available sensor definitions, which may include, for example, a field of view (FoV) model and parametrization of the sensors 262 at operation 406; and determine or identify statistic information about the dynamic environment at operation 408, which may include, for example, information about the expected vehicle traffic patterns and the like. The configuration subsystem 306 may generate the environment model further using data of records 332-334 discussed previously.

In an example, the environment model includes information about three different categories: static environment including the area of interest 63 and the regions accessible for sensor 262 placement, blocked areas and obstacles in the form of a grid where individual grid cells of the area of interest 63 is characterized by its required degree of coverage (one or multiple times); define the sensors 262 in terms of their functional properties (e.g., sensor reading range, opening angle, sensing type, etc.) and non-functional properties (e.g., cost of deployment, etc.); and statistic information about dynamic traffic patterns in the form of semi-transparent obstacles in order to account for object occlusions, for example, a lane that is occupied by passing objects with a certain probability that one or more objects will block the LoS of a sensor 262 for a period of time. In another example, semi-dynamic obstacles such as construction sites can be readily incorporated as statistical information. Placing sensors 262 at or near regions of frequent occupancy should be reconsidered.

In embodiments, the generated environment model of the coverage area 63 may include a grid of a plurality of cells. The grid cells may be 2D or 3D cells. Each grid cell may have the same or different sizes and may be defined in terms of GNSS/GPS coordinates or using some other coordinate system. In some embodiments, operation 402 includes the SAS 301 (or map processing subsystem 309) determining map grid boundaries of the environment model, and storing the defined environment model and grid boundaries in the mapping DB 320.

At operation 410, the SAS 301 (or configuration subsystem 306) performs sensor arrangement optimization. In embodiments, the SAS 301 (or configuration subsystem 306) applies one (or more) of several possible optimization algorithms to minimize the number of required sensors 262, while fully covering the coverage area 63. Here, fully covering the coverage area 63 refers to each cell in the environment model capable of being sensed or observed by one or more sensors 262 (within some margin of error). In addition, the SAS 301 (or configuration subsystem 306) may also optimize the sensor 262 positions and orientations to provide flexibility to readjust the sensor 262 focus areas based on trigger events or conditions. In embodiments, an appropriate optimization algorithm is applied, depending on the size and complexity of the coverage area 63 and the number and properties of the sensors 262. Some optimization algorithms that may be used may include, for example, gradient descent algorithms, downhill simplex algorithms, simulated annealing algorithms, or evolutionary algorithms (including genetic algorithms). In an example, the configuration subsystem 306 may operate a genetic algorithm (GA) to deploy and reconfigure sensors 262 in a sensor arrangement. GAs are a tool for multi-objective optimization, and are efficient for large and complex state spaces. Example embodiments are discussed herein in the context of using a GA for optimizing sensor arrangement, however, the embodiments herein are not limited to using genetic algorithms and any other type of optimization algorithm may be used, such as those discussed herein.

Generally, a GA includes a population of candidate solutions to an optimization problem, which are evolved toward better solutions. Each candidate solution has a set of properties (e.g., its "chromosomes" or "genotype") which can be mutated and altered. In some cases, candidate solutions are represented in binary as strings of 0s and 1s, but other encodings are also possible. In this example, the variable sensor parameters in sensor objects represent the genes of the GA, while a given set of sensors 262 forms a chromosome or solution. GA usually starts from a population of randomly generated individuals, and is an iterative process. The population in each iteration is referred to as a "generation." In each generation, the fitness of every individual in the population is evaluated, where the more fit individuals are stochastically selected from the current population, and each individual's genome is modified (e.g., recombined and possibly randomly mutated) to form a new generation. The new generation of candidate solutions is then used in the next iteration of the GA. The algorithm terminates when either a maximum number of generations has been produced and/or a satisfactory fitness level has been reached for the population.

In example embodiments, GA starts from a random configuration and aims at improving the global sensor 262 line-up by keeping the best sensor 262 positions and/or orientations while eliminating the least useful sensor 262 positions/orientations. This is done during a crossover operation at or during each iteration. A crossover operation (or crossover function) is a process of producing a child solution from two or more parent solutions (e.g., "chromosomes"). In embodiments, a crossover function is constructed that rates or ranks all individual sensors 262 of the two parent configurations, selects, and combines the best candidate solutions until the full coverage area 63 is covered. The ranking criteria is discussed in more detail infra. Any suitable ranking or ordering may be used, such as numerical ranks or character-based ranks. In the event of a ranking tie (e.g., where two or more sensors 262 have a same rank), one sensor 262 is picked at random. All remaining sensors 262 are discarded to avoid an abundant number of sensors 262 in the sensor arrangement. For the value assessment of an individual sensor 262, the sensors 262 are ranked using two criteria with staged priority. The first criterion is a number of previously uncovered cells (or non-observable cells) that a sensor 262 will cover (or observe) given the current orientation, and the second criterion is a number of cells that are in range of that sensor 262. An example of sensor ranking is described with respect to FIG. 5.

Figure 5:
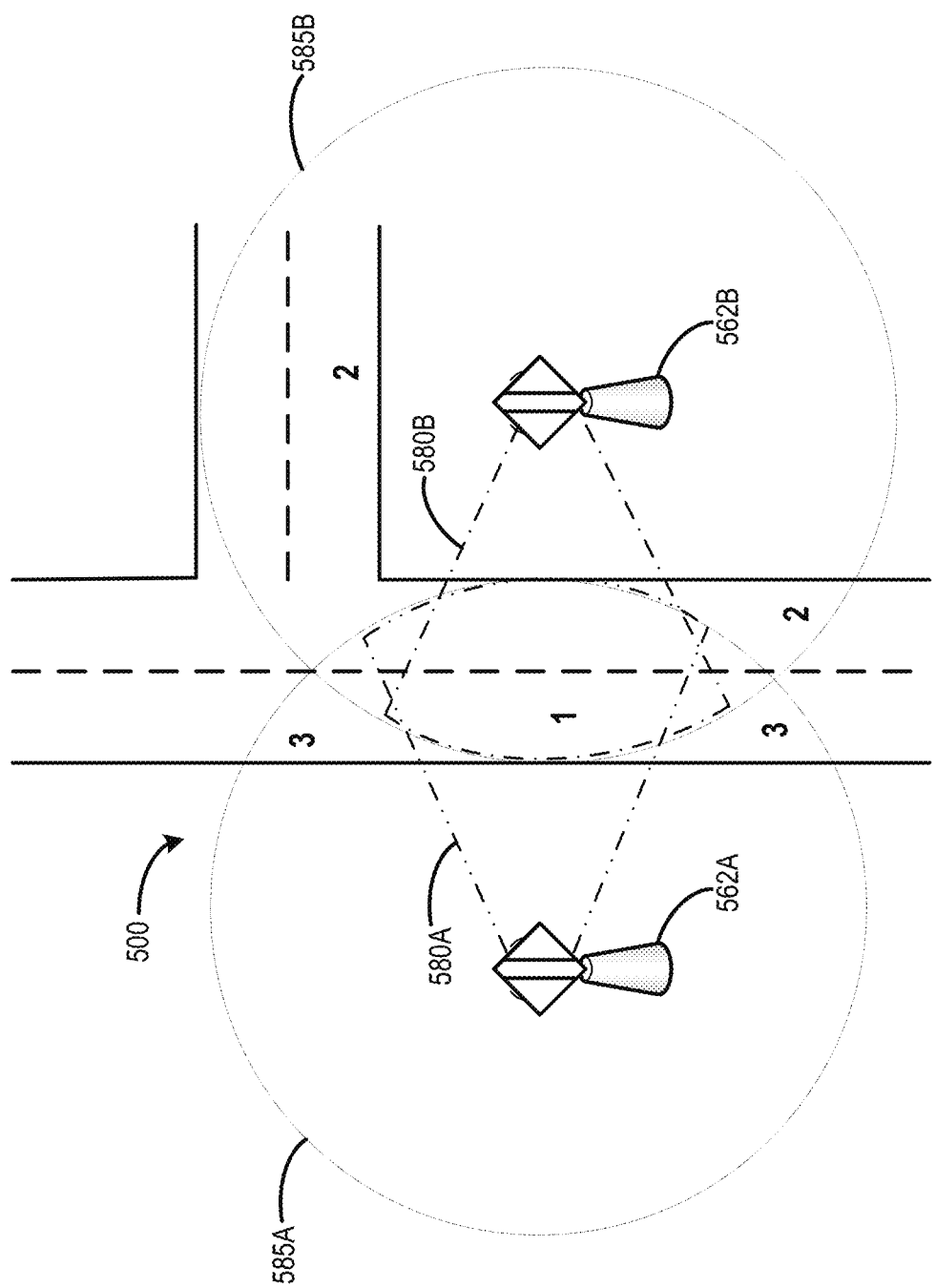
FIGS. 5-6 illustrate respective example sensor arrangements according to various embodiments.

Referring now to FIG. 5, which illustrates an example sensor arrangement 500, according to various embodiments. The example of FIG. 5 shows an example assessment of the value or rank of individual sensors 262 using the example candidates sensors 562A and 562B, which have current sensing regions (or sectors) 580A and 580B, respectively, and potential sensing areas 585A and 585B, respectively. First, the direct contribution in current coverage is evaluated for each candidate sensor 562A and 562B, which in this example, is region 1 for both potential sensor placements (e.g., the positions and orientations of candidate sensors 562A and 562B shown in FIG. 5). Second, the potential coverage for reconfiguration is calculated. In this example, candidate sensor 562B can possibly cover region 2, which is larger than region 3 for candidate sensor 562A because region 2 includes more roadway segments than region 3. Therefore, candidate sensor 562B is favorable in comparison to candidate sensor 562A, and candidate sensor 562B will be ranked higher than candidate sensor 562A.

Referring back to FIG. 4, besides the crossover, a mutation operation is performed at each iteration. In embodiments, the configuration subsystem 306 uses a Gaussian mutation rate and a mutation function that has a finite chance of adjusting, removing, and/or adding a sensor 262 in a random way. In this way, an optimal number of sensors 262 can be determined.

A metric to assess the fitness of a (global) solution, in contrast to the value of an individual sensor 262, is defined by the cost function of equation 1.

$$\text{cost} = a\ N_{cov} + b\ N_{prio} - c\ N_{sens} + d\ N_{ovlap} \quad \text{[Equation 1]}$$

Figure 6:
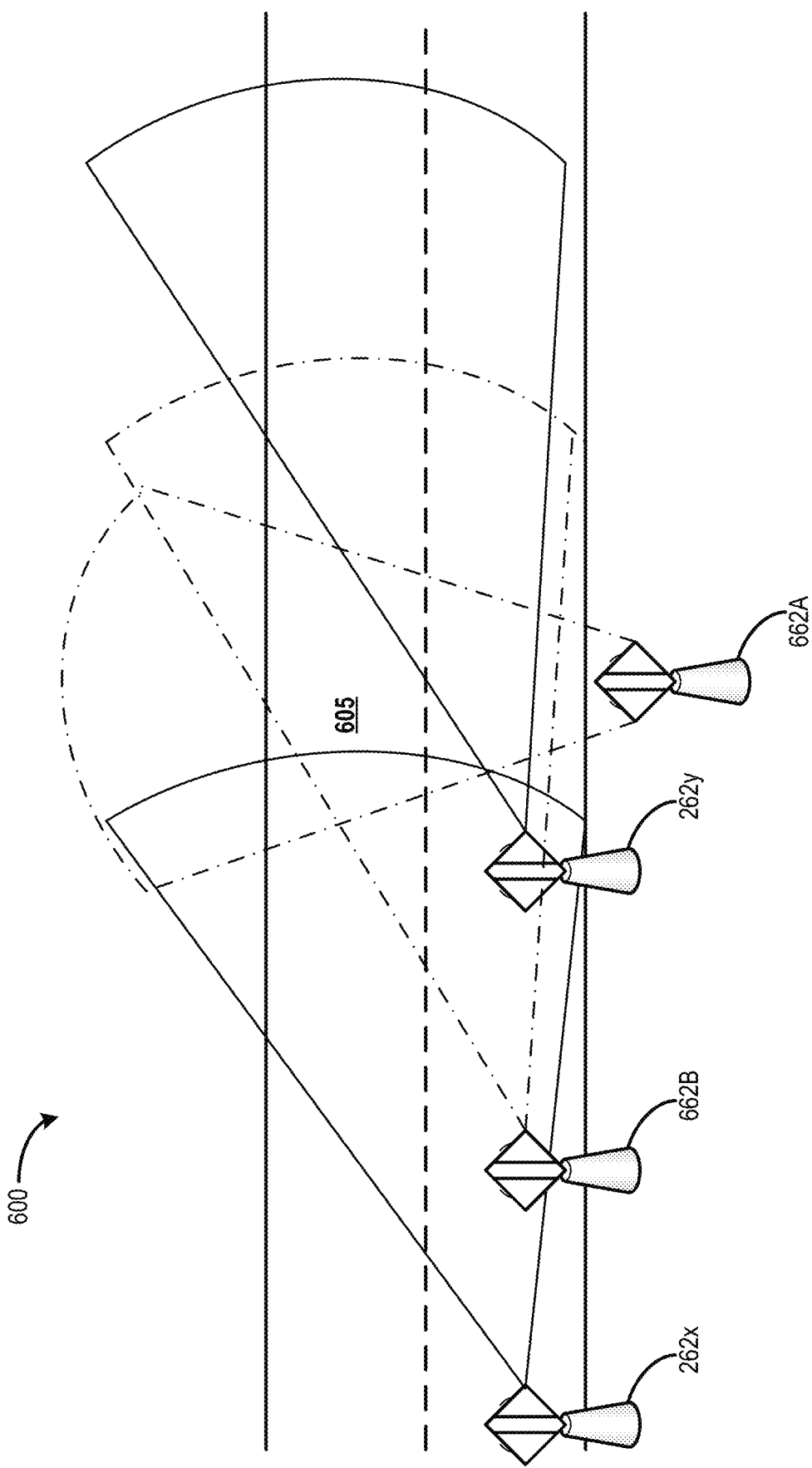

In equation 1, $N_{cov}$ is the number of (at least once) covered grid cells, $N_{prio}$ is the number of cells that were covered multiple times due to special priority (see above), $N_{sens}$ is the number of sensors used, and $N_{ovlap}$ is the number of cells that were covered more than once without having a special priority (see e.g., FIG. 6). Also, a, b, c, and d are non-negative weighting coefficients. We here choose an optimization procedure that aims mainly for the main target of covering all grid cells according to their desired priority with as few sensors as possible. On the other hand, overlap that arises naturally during the sensor positioning is preferred over a waste of sensing coverage, which again facilitates subsequent reconfiguration. This leaves us with a weighting hierarchy of a=b, a>c, and c>d.

Referring now to FIG. 6, which illustrates an example sensor arrangement 600, according to various embodiments. The example of FIG. 6 is an example of cost parameter determination for the cost parameter $N_{ovlap}$. The segment 605 is not yet covered by an existing placement solution, which includes sensor 262x and sensor 262y, and two additional candidate sensors 662A and 662B are considered to resolve this coverage issue. While both candidates sensors 662A and 662B succeed in covering the segment 605, the sensor candidate 662B has a much larger overlap with the remaining area of interest, even though covered already, and should therefore be preferred over sensor candidate 662A (at least in terms of the cost parameter $N_{ovlap}$). The rationale is that redundant coverage (i.e., overlapping coverage areas) helps to improve the overall quality of information.

Referring back to FIG. 4, the optimization of operation 410 is terminated after a predefined number of generations. While the cost function of equation 1 is a valid metric for the final result of the optimization procedure, in some embodiments, a simplified measure that allows for a better interpretation by the user may be used. For example, equations 2.1 and 2.2 quantify the success and efficiency of the optimization procedure.

$$c = \frac{A_{a,cov}}{A_a} \quad \text{[Equation 2.1]}$$

$$c_{eff} = \frac{A_a}{N_{sens} A_{sens}} \quad \text{[Equation 2.2]}$$

In equation 2.1, c represents the coverage of the area of interest (e.g., the road 63), which is the ratio of $A_{cov}$ to $A_a$, where $A_{cov}$ is the area covered by the sensor field, and $A_a$ is the entire area of the street. Equation 2.1 is proportional to $N_{cov}$ in the cost function of equation 1. On the other hand, $c_{eff}$ in equation 2.2 quantifies the efficiency of the coverage.

In equation 2.2, $A_{sens}$ is the area covered by an individual sensor 262. Equation 2.2 is inverse proportional to the sensor number $N_{sens}$ of the cost function of equation 1.

At operation 412, the SAS 301 (or configuration subsystem 306) stores the optimized sensor arrangement in the arrangement DB 330 (e.g., as a sensor arrangement record 331) for future reference. In embodiments, the initial optimized sensor arrangement 331 includes a representation of the observed area 63, a list of sensor 262 locations in the form of grid coordinates, as well as sensor type(s) and sensor orientation information. Areas of interest with special priorities are acknowledged and incorporated in the sensor arrangement 331. Since the sensor arrangement is stored in a centralized database (e.g., arrangement DB 330 of FIG. 3), the SAS 301 has full access to the sensor configuration parameters, and will therefore be able to resume the initial setup in case no reconfiguration triggers are present.

After the initial sensor arrangement is stored in the arrangement DB 330, process 400 enters mode B at operation 414 for dynamic reconfiguration of the sensor arrangement. At operation 414, the SAS 301 (or configuration subsystem 306) initializes the sensor arrangement. For example, the configuration subsystem 306 may be initialized with the results of the sensor deployment optimization from mode A, configured to interpret the sensor results using known data fusion algorithms, and set up to monitor the sensor service. In this example, the configuration subsystem 306 may obtain the stored sensor arrangement record 331 from the arrangement DB 330

As discussed previously, the arrangement DB 330 stores the sensor arrangement parameters such as the positions, or current and preferred sensing directions. In embodiments, the configuration subsystem 306 is in full control of the sensors 262 assigned to the observation area 63, and is calibrated to correctly interpret sensor outputs in relation to a global coordinate system. Existing sensor-data-fusion techniques are available to the configuration subsystem 306. Additionally, configuration subsystem 306 (or the sensor interface subsystem 310) is able to detect sensor failures. A failure can manifest itself in the form of a halt failure or an erratic failure, which requires different detection techniques such as watchdog services or anomaly detection, respectively.

At operation 416, the SAS 301 (or the configuration subsystem 306) determines whether a reconfiguration trigger has been detected. Each trigger signals that the intended coverage area 63 and the current sensor arrangement no longer match, and therefore, the sensor arrangement should to be modified. In embodiments, the reconfiguration of the sensor arrangement is triggered by one of the three events, a sensor 262 failure, malfunction, or provides erratic or erroneous sensor data; detecting an unexpected obstacle (e.g., a traffic accident, a parked truck for longer than a predefined amount of time, a construction site that exists for several days, etc.); and an external configuration event changing the observed area 63 and/or priorities of individual grid cells (e.g., a change of the traffic conditions such as a lane closure, construction site, etc.). If the SAS 301 (or the configuration subsystem 306) does not detect a trigger at operation 416, the SAS 301 (or the configuration subsystem 306) loops back to operation 414 to initialize the current sensor arrangement. In other embodiments, the SAS 301 (or the configuration subsystem 306) may simply continue to monitor for trigger events/conditions.

If the SAS 301 (or the configuration subsystem 306) detects a trigger at operation 416, the SAS 301 (or the configuration subsystem 306) proceeds to operation 418 to execute reconfiguration of the sensor arrangement. In some embodiments, the reconfiguration exploits the same optimization mechanisms as used for mode A, however, keeping fixed geo-positions of sensors 262, and only adjusting the sensor 262 orientations. For example, in mode B, sensing element focus directions and opening angles of one or more sensors 262 can be altered, while the geo-positions of the sensors 262 remain fixed. Optionally, the current conditions in the observed area 63 can be taken into account when determining how to reconfigure the sensor arrangement. That means a sensor 262 may not be reconfigured if certain (e.g., desired or important) activities are ongoing in its observation sector. For example, if a traffic accident is detected in one or more sensor 262 sectors, then those sensor(s) 262 may not be re-oriented or re-positioned during the mode B sensor arrangement determinations. In another example, a sensor 262 may not be reconfigured if the object detector 305 or the configuration subsystem 306 identifies events that require immediate attention, such as a vulnerable user in an area of high risk. If the original trigger event/condition for the reconfiguration no longer exists due to, for example, a failed sensor 262 being replaced with a new operational sensor 262, the original sensor configuration may be resumed.

In another example at operations 402-404, the environment model is defined as a 2D grid with variable cell sizes. The configuration subsystem 306 or map processing subsystem 309 assigns each cell one or more of five properties/tags, including: obstacle, blocked, area, free, and sensor. An obstacle is a grid cell that is not available for sensor 262 placement due to, for example, the LoS of other sensors 262 in range being blocked. As examples, an obstacle cell may include buildings/walls, vegetation, or other like physical objects. A blocked cell is not available for sensor 262 placement either, however, a blocked cell does not interfere with a sensor's 262 FoV. As examples, a blocked cell may include sidewalks or private property that is unavailable for sensor 262 placement. The set of all area cells form the coverage area 63 to be covered by sensors 262, while the free cells define available positions for sensor 262 placement. Eventually, once a sensor 262 is placed, the configuration subsystem 306 or map processing subsystem 309 assigns that cell with the property/tag sensor, which precludes the further positioning of other sensors 262 (or other sensors 262 with the same sensor capabilities) at the same position.

Object 64 traffic on a specific area segment can constitute a significant sensing barrier for behind area segments. In this regard, two additional features (or parameters/attributes) may be assigned to cells to respect such dynamic occlusions in the sensor placement process. First, a subset of the area cells, which is expected to be frequently occluded can be assigned a priority value indicating that such area cells should be covered by at least two sensors 262. On the other hand, a hybrid cell type of area and obstacle, with a variable degree of transparency, which can be set to reflect the expected traffic density. Dynamic objects 64 on or in the coverage area 63 may be considered by either assigning priorities or defining transparent sensing barriers. A corresponding, randomly selected portion of grid cells in the shadow of a transparent obstacle is occluded.

In this example at operation 406, the configuration subsystem 306 may generate the sensor model to include one or more sensor objects. In this example, a sensor object s is defined by the tuple s={r, ω, x, y, φ}, where r is the maximum sensing range of a sensor 262, ω is the horizontal FoV of the sensor 262, x and y are the grid coordinates of the sensor 262 location (e.g., in GNSS coordinates, Cartesian coordinates, or the like), and $\phi$ is the sensor 262 orientation angle relative to the x-axis. The parameters r and $\omega$ can be adapted to model different sensor types such as camera, radar, LiDAR, and/or some other sensor type such as those discussed herein. The continuum of orientation angles $\phi$ is reduced to a finite number of viewing angles from a selected location to all existing area cells of the coverage area 63. For purposes of the optimization, a sensor 262 may be assumed to exhibit uniform detection capabilities across its FoV. In some embodiments, ML or AI algorithms may be fed with detection capabilities of individual sensors 262 for refinement of the detection capabilities across sensor FoV for future sensor arrangement reconfigurations. In embodiments, the variable sensor parameters may represent the genes of a GA, while a given set of sensors 262 forms a chromosome or solution.

Continuing with this example at operation 410, a fitness function $f$, shown by equation 3, is used to evaluate the quality of a solution.

$$f = \alpha N_{cov}(1) + \beta N_{prio} - \gamma N_{sens} + \delta \sum_{n=2}^{N_{sens}} \frac{N_{cov}(n)}{n-1} \quad \text{[Equation 3]}$$

In equation 3, $N_{cov}(n)$ is the number of area cells that are covered at least n times by a respective sensor network configuration, where n is a number. An area cell may be considered to be covered by a sensor 262 if the cell's center is in the sensor's 262 FoV (i.e., for a particular opening angle setting at a particular position). $N_{prio}$ represents the number of area cells whose additional priority constraints were satisfied, and $N_{sens}$ is the total number of deployed sensors 262. The first and second terms in equation 3 (e.g., $\alpha N_{cov}(1)$ and $\beta N_{prio}$) attribute a reward in case that an area cell is covered at all, and that it satisfies its predetermined priority, respectively. The third term (e.g., $\gamma N_{sens}$) penalizes the use of additional sensors 262, while the fourth term $$\left(\text{e.g., } \delta \sum_{n=2}^{N_{sens}} \frac{N_{conv}(n)}{n-1}\right)$$

rewards the overlap of the FoVs of multiple sensors 262. Note that the latter optimizes the efficiency of the solution, as it tries to avoid a waste of sensing space if full coverage of the coverage area 63 is already achieved. To promote a more homogeneous coverage, overlap of a higher degree may be assigned a slightly reduced reward. The weighting factors $\alpha$, $\beta$, $\gamma$, and $\delta$ determine the hierarchy of the various objectives of the optimization procedure. For a relatively dependable surveillance, the boundary conditions $\beta=\alpha-\delta$ (to avoid double counting), $\alpha>\gamma$, and $\gamma>\delta$ may be stipulated. In particular, to make sure that extra overlap is not generated at the cost of additional sensors 262, the following may be used: $\{\alpha, \beta, \gamma, \delta\} = \{2N_{area}, 2N_{area}-1, N_{area}, 1\}$, where $N_{area}$ is the number of area cells in the scenario.

Continuing with this example at operation 410, the selection of parent solutions controls the balance between diversity and the favoritism of the fittest specimen in the population. The initial population size is parametrized by N. In each generation, N/2 offspring solutions are generated by N parents, and subsequently N solutions are selected from the total pool of 3N/2 chromosomes to keep the population size constant. The selected specimens are paired randomly to generate one child chromosome each at a predefined crossover probability $p_{cross}$. In embodiments, the following selection procedure may be used: The fittest ten percent of the population are directly transferred to the next generation, while diversity is maintained by a variable injecting rate of $p_{div}N$ new chromosomes to the mating pool. The remaining slots are filled by a roulette wheel selection scheme. Further, elitism may be included in the selection procedure wherein a copy of the best chromosome of a generation is passed on to the next generation without being exposed to a mutation.

Continuing with this example at operation 410, for the structure of the problem at hand, an intuitive crossover approach may be used to swap a certain number of sensors 262 from two parent solutions. However, this does not provide a very efficient optimization path for the variation of the coverage problem. Instead, in various embodiments, a more guided crossover function, in the form of sequential gene ranking, may be used. To crossbreed a new offspring chromosome, the individual genes of the two parent solutions are ranked in terms of the number of area cells they cover given the current sensor 262 orientation and position, and the number of area cells that are in range of the sensor 262 given the current position. Note that the latter is of interest because sensors with more area cells in their vicinity have a higher chance to end up in a valuable configuration after a subsequent rotating, as it can occur, for example, during the mutation phase. This parameter may act as a secondary decision criterion to break ties with respect to the primary criterion. The gene with the best ranking is carried over to the offspring chromosome, and removed from the ranking list. The portion of area cells covered by this particular sensor 262 is as well excluded from the scene, before the subsequent ranking is performed. The crossover operation terminates if no parent genes are left, or if the remaining ones provide zero coverage. Next, a Gaussian mutation scheme is applied to the pool of both parent and child solutions, which disturbs an average portion of $p_{mut}$ percent of the population. For a given gene, the equally likely options of mutation are a modification of the position, the orientation angle, and/or the deletion of the respective sensor. Furthermore, a finite chance that mutation adds a random gene to the chromosome.

Continuing with this example at operation 410, the GA may include a termination threshold and success metric. The optimization procedure is stopped if the fitness value does not change anymore over a specified period of five consecutive generations. While the fitness function of equation 3 is well suited to assess the final outcome of the optimization procedure, its interpretation might not be intuitive. To give a better understanding of the quality of a configuration, additional success metric(s) are given by equations 4 and 5.

$$c = \frac{N_{cov}(1)}{N_{cov}(0)} \propto N_{cov}(1) \quad \text{[Equation 4]}$$

$$c_{eff} = \frac{N_{cov}(0) l_{grid}^2}{N_{sens} r^2 \omega / 2} \propto N_{sens}^{-1} \quad \text{[Equation 5]}$$

In equations 4 and 5, $\propto$ is a "proportional to" operator. In equation 5, $l_{grid}$ is the grid cell length. While $0 \leq c \leq 1$ quantifies the covered portion of the area of interest, $c_{eff}$ relates to the average density of the senor configuration with respect to the area space. The distribution is more efficient the closer the solution gets to $c_{eff}=1$.

Continuing with this example at operation 410, the GA may include a greedy local search operation. GAs are well suited to find solutions of high fitness within a large search space, however, their nature makes the identification of a global optimum in general improbable. Therefore, in various embodiments, a subsequent greedy search optimization is applied to the best chromosomes found by the GA to further refine the optimal sensor 262 arrangement. In embodiments, the search follows the steepest ascent of the global fitness function as determined by local variations of each individual sensor of the ensemble. In particular, for each sensor 262, the local search operation varies the location, up to any of the twelve next-nearest neighbors of the grid, if available for sensor positioning; and varies the working direction, checking the ten next best discrete angles up to nearest neighbors. The local search operation also checks if it is favorable to eliminate the respective sensor 262.

Continuing with this example at operation 410, the GA may include a symmetrization operation. Depending on the form of the sensing field, the topography of the sensor 262 placement region, etc., the sensor arrangement procedure 400 may naturally reproduce symmetries of the underlying environment map. In anticipation of this effect, the identification of characteristic patterns and a respective symmetrization of the candidate solutions can help the success of the procedure. However, while symmetry patterns are rather intuitive to the human eye, typical optimization algorithms are agnostic of this feature. Therefore, some embodiments may include the following approach: A given chromosome is first augmented with symmetry seeds wherein all operations of a symmetry group are subsequently applied, and the respective sensors 262 are added to the arrangement. Next, an elimination operator seeks to pick the best, and at the same time most symmetry-compliant sensors 262 from the augmented solution. This operator is similar to a self-crossover operation discussed previously with a modified ranking method wherein genes are ranked by the number of times a sensor 262 appears in the augmented sensor arrangement, and the number of area cells the sensor 262 covers. The operator picks the most symmetry-compliant seed from the full sensor arrangement in the first iteration and uses it to breed a new offspring solution. For the remainder of this procedure, the first ranking criterion then refers to the offspring solution itself, to pursue a started symmetry pattern for as long as possible. This optimization procedure is highly impacted by the number of pattern breaks. A pattern break occurs if no available sensor 262 complies with the existing symmetry, but still there are area cells to be covered, such that a new pattern has to be started. By restricting the allowed number of pattern breaks, as estimated from the scene, the symmetrization procedure can be facilitated. For example, for a straight road segment, two individual symmetry patterns can be expected on both sides of the road, leading to one pattern break. For translation-symmetric maps, a subroutine examines the optimal translation vector. After the symmetrization operation, another local search can help to remove redundant sensors 262.

Figure 7:
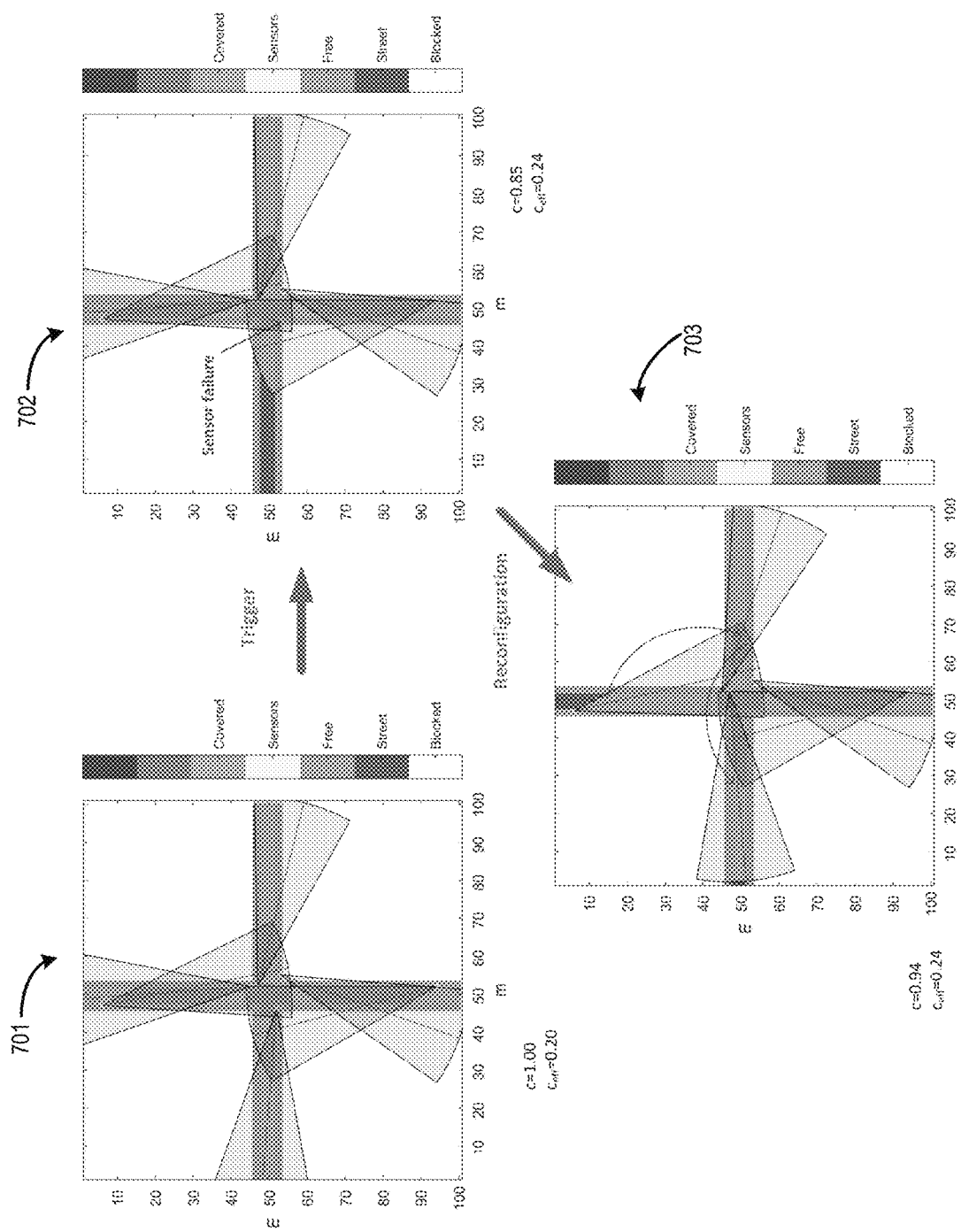
FIGS. 7-8 show performance results of sensor arrangement procedures for respective example use cases according to various embodiments.
Figure 8:
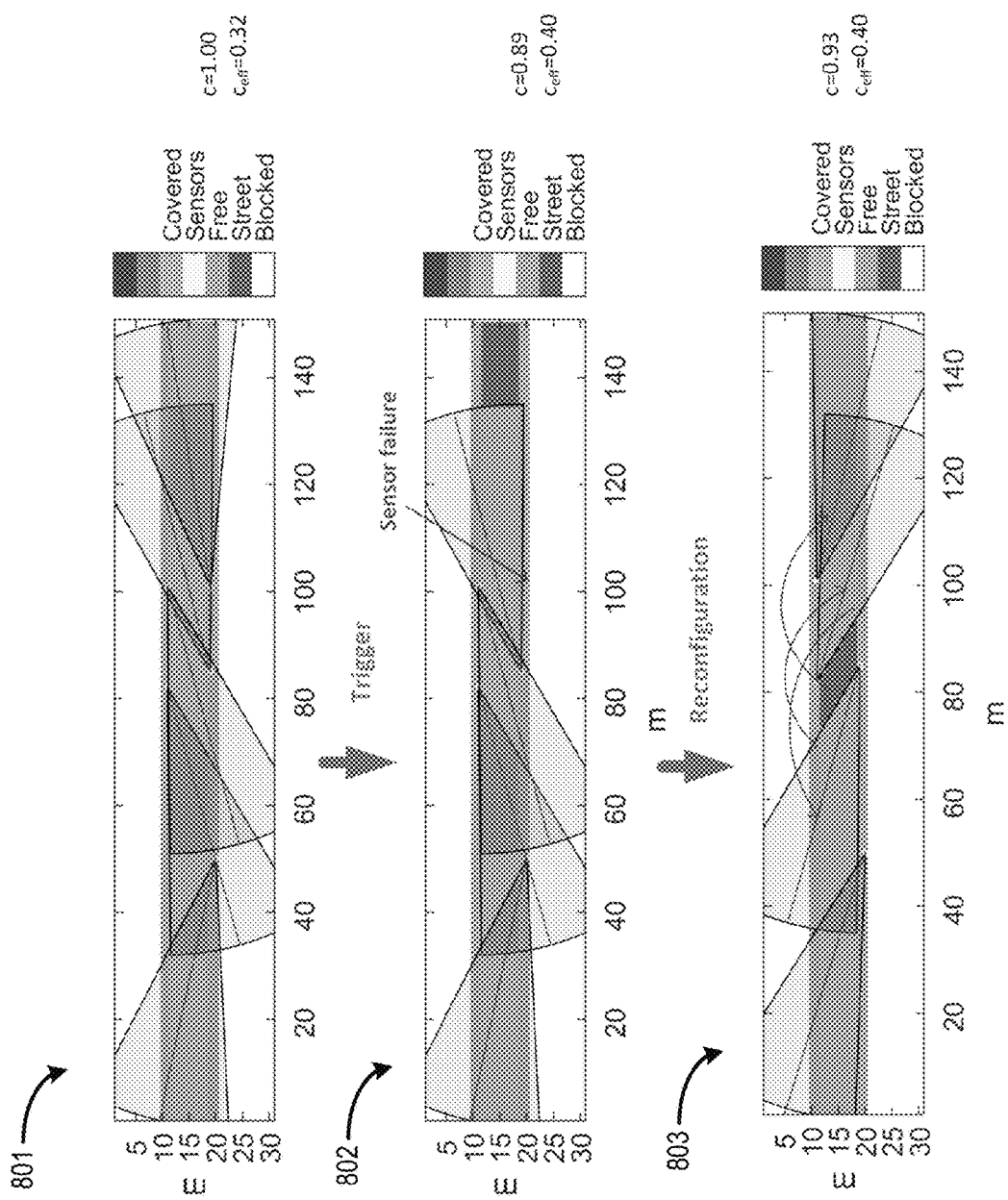

FIGS. 7-8 show performance results for respective example use cases according to various embodiments. In the example use cases, the optimization algorithm was used to identify road segments, which were occluded by obstacles, was tested using MATLAB® toolboxes. As a result of this calculation, the algorithm reduces the value of a particular sensor position(s) affected by obstacle occlusions.

Referring to FIG. 7, which shows an exemplary reconfiguration of a sensor network covering a 4-way intersection of 100×100 m$^2$ after a sensor failure. FIG. 7 presents a 100×100 m$^2$ map of a 4-way intersection, with a grid resolution of 1 m$^2$. A range of 50 m and 30° FoV characterizes the sensors 262. In the example of FIG. 7, only a small strip along the roadside is allowed for sensor 262 placement. A full-coverage solution is found deploying six sensors around the junction. The sensors 262 in the sensor network are deployed and operational at node 701. At node 702, a sensor failure on the left hand side road segment triggers reconfiguration of the sensor network. After the sensor failure at node 703, the reconfiguration algorithm suggests to rotate two sensors to compensate the outage. This adaptation improves the c from 0.85 (node 702) to 0.94 (node 703).

Referring now to FIG. 8, which shows the sensor reconfiguration after a sensor failure for a 150×30 m$^2$ highway segment. In the example of FIG. 8, we study a highway segment of 150 m length, which is found to be completely monitored by a field of five sensors at node 801. In case the rightmost sensors fails at node 802, a substantial part of the road is out of reach. In this example, the reconfiguration algorithm adapts three sensors to improve the road surveillance at node 803, leaving only a small strip in the center uncovered (increasing c from 0.89 to 0.93).

In both examples shown by FIGS. 7 and 8, efficient sensor positioning with a high reconfiguration capacity was achieved in mode A, and sensor failures were compensated to a significant extent in terms of road coverage (mode B), making the sensor field resilient to sensor failures or faults.

II. Example Implementations

Figure 9:
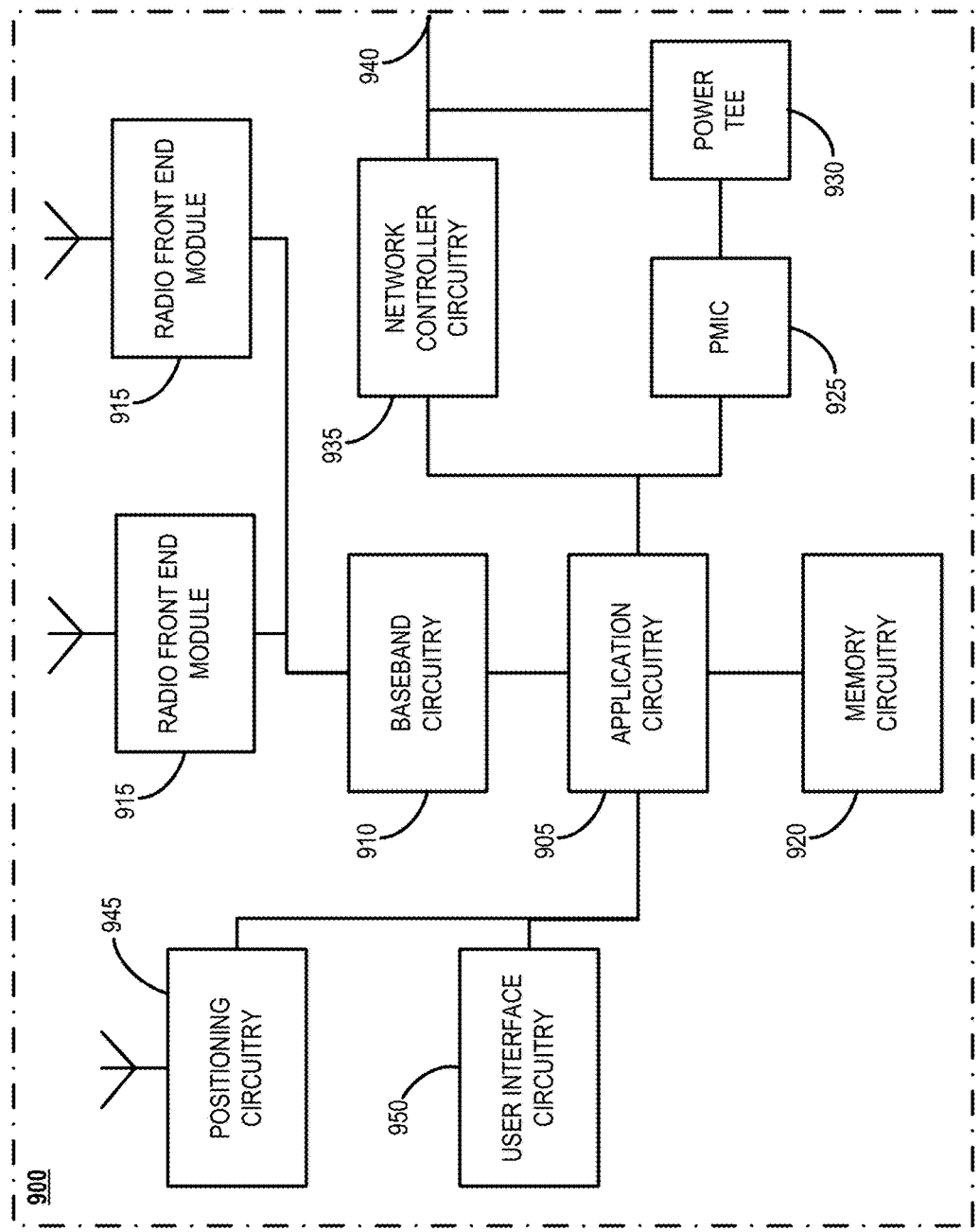
FIG. 9 illustrates an example implementation of infrastructure equipment in accordance with various embodiments.

FIG. 9 illustrates an example of infrastructure equipment 900 in accordance with various embodiments. The infrastructure equipment 900 (or "system 900") may be implemented as a base station, radio head, access network node (e.g., the (R)AN nodes 256 and/or infrastructure equipment 61), edge node(s) 257, server(s) 260, and/or any other element/device discussed herein. In other examples, the system 900 could be implemented in or by a UE or object 64. In various embodiments, the various subsystems and elements of system 300 of FIG. 3 may be implemented by the components of system 900.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, positioning circuitry 945, and user interface 950. In some embodiments, the device 900 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose I/O, memory card controllers such as a Secure Digital (SD) Multi-Media Card (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more FPGAs; PLDs such as CPLDs, HCPLDs, and the like; ASICs such as structured ASICs and the like; PSoCs; and/or the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where the subsystems of system 300 of FIG. 3 (e.g., SAS 301 and/or subsystems thereof, sensor interface subsystem 310, and/or other like subsystems/components of system 300) are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 905 may be specifically tailored for operating the agents and/or for ML functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 910 may be implemented, for example, as a solder-down substrate including one or more integrated circuits, a single packaged integrated circuit soldered to a main circuit board or a multi-chip module containing two or more integrated circuits. The baseband circuitry 910 includes one or more processing devices (e.g., baseband processors) to carry out various protocol and radio control functions. Baseband circuitry 910 may interface with application circuitry of system 900 for generation and processing of baseband signals and for controlling operations of the RFEMs 915. The baseband circuitry 910 may handle various radio control functions that enable communication with one or more radio networks via the RFEMs 915. The baseband circuitry 910 may include circuitry such as, but not limited to, one or more single-core or multi-core processors (e.g., one or more baseband processors) or control logic to process baseband signals received from a receive signal path of the RFEMs 915, and to generate baseband signals to be provided to the RFEMs 915 via a transmit signal path. In various embodiments, the baseband circuitry 910 may implement a real-time OS (RTOS) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 9, in one embodiment, the baseband circuitry 910 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 915 are cellular radiofrequency communication system, such as millimeter wave (mmWave) communication circuitry or some other suitable cellular communication circuitry. In the first example, the protocol processing circuitry would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the RFEMs 915 are WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 910 and/or RFEMs 915. The baseband circuitry 910 may also support radio communications for more than one wireless protocol.

Continuing with the aforementioned embodiment, the baseband circuitry 910 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 915 may comprise an mmWave RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 915, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 920 may include one or more of volatile memory including DRAM and/or SDRAM, and nonvolatile memory (NVM) including high-speed electrically erasable memory (commonly referred to as Flash memory), PRAM, MRAM, etc., and may incorporate the 3D cross-point (XPOINT) memories from Intel® and Micron®. Memory circuitry 920 may be implemented as one or more of solder down packaged integrated circuits, socketed memory modules and plug-in memory cards. The memory circuitry 920 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 900, an operating system of infrastructure equipment 900, one or more applications, and/or for carrying out the embodiments discussed herein (such as one or more operations of depicted by FIG. 4 and/or the like). The computational logic may be stored or loaded into memory circuitry 920 as instructions for execution by the processors of the application circuitry 905 to provide or perform the functions described herein. The various elements may be implemented by assembler instructions supported by processors of the application circuitry 905 or high-level languages that may be compiled into such instructions. The permanent copy of the programming instructions may be placed into persistent storage devices of memory circuitry 920 in the factory during manufacture, or in the field through, for example, a distribution medium (not shown), through a communication interface (e.g., from a distribution server), and/or over-the-air (OTA).

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols. In various embodiments, the network controller circuitry 935 enables communication with associated equipment and/or with a backend system (e.g., server(s) 130 of FIG. 1), which may take place via a suitable gateway device. In some embodiments, such as in smart factory implementations, the communication technologies used for the network controller circuitry 935 may include a variety of dedicated industrial Ethernet technologies such as Sercos®, PROFINET®, and EtherCAT®. These communication technologies are used, for example, for interconnecting sensors (e.g., sensors 262 of FIG. 2), actuators (e.g., actuators 322 of FIG. 3), and controllers (e.g., SAS 301 or main system controller 302 of FIG. 3) in an automation system.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various other infrastructure equipment, or the like.

The components shown by FIG. 9 may communicate with one another using interface circuitry, which may include any number of bus and/or interconnect (IX) technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system. Other bus systems may be included, such as point-to-point interfaces, and a power bus, among others. In some embodiments, such as in smart factory implementations, the communication technologies used for the IX may include dedicated fieldbuses such as PROFIBUS®, CC-Link® and CAN®. These communication technologies may be used, for example, for interconnecting sensors (e.g., sensors 262 of FIG. 2), actuators (e.g., actuators 322 of FIG. 3), and controllers (e.g., SAS 301 or main system controller 302 of FIG. 3) in an automation system.

Figure 10:
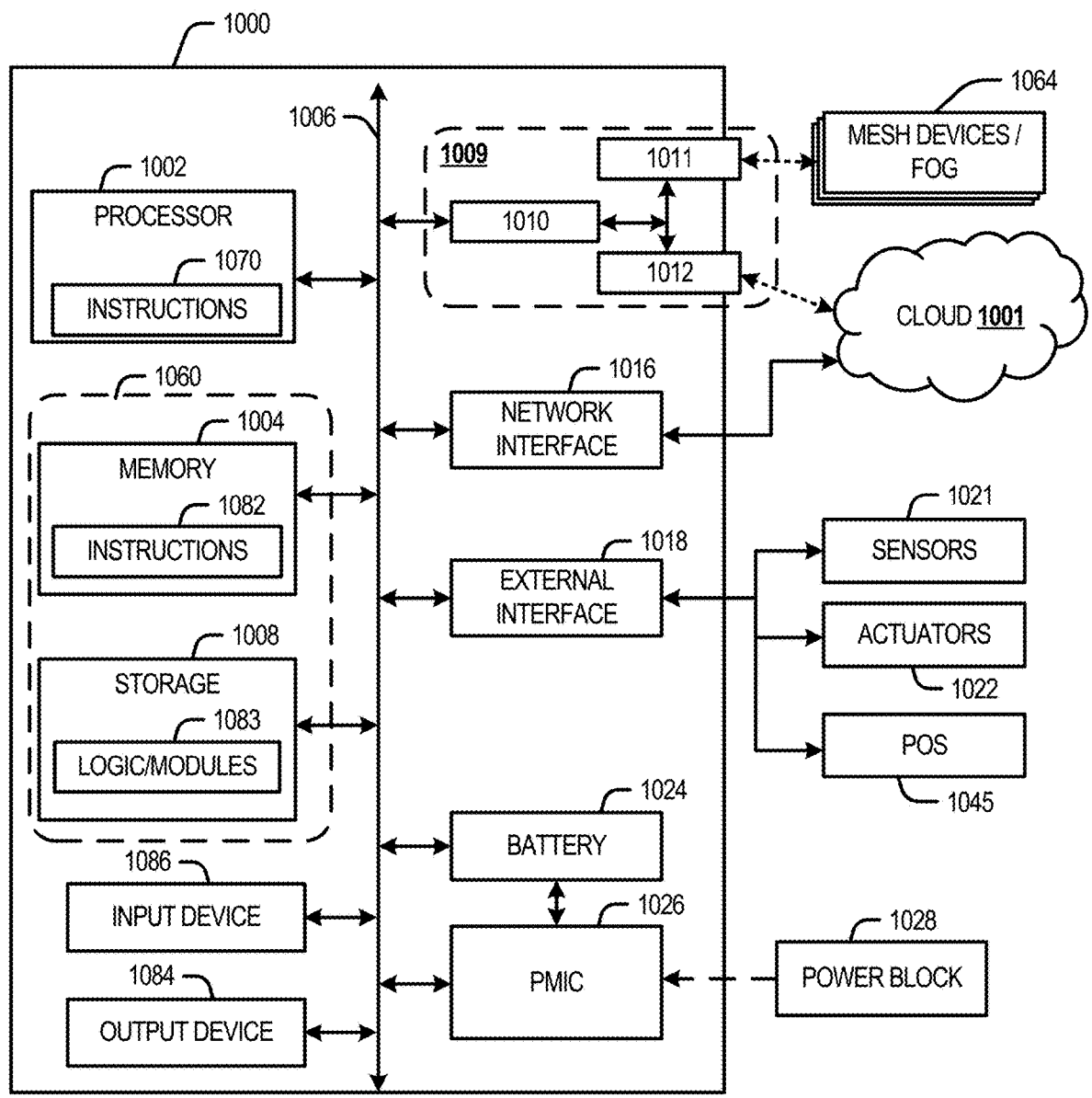
FIG. 10 illustrates an example implementation of a computing architecture, in accordance with various embodiments.

FIG. 10 illustrates an example of an platform 1000 (also referred to as "system 1000," "device 1000," "appliance 1000," or the like) in accordance with various embodiments. In embodiments, the platform 1000 may be suitable for use as vUE system 201, communication technology 250, and other objects 64, and/or any other element/device discussed herein with regard to FIGS. 1-6. Platform 1000 may also be implemented in or as an infrastructure equipment 61, edge node 257, server computer system or some other element, device, or system discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The example of FIG. 10 is intended to show a high level view of components of the computer platform 1000. However, some of the components shown may be omitted, additional components may be present, and different arrangement of the components shown may occur in other implementations.

The platform 1000 includes processor circuitry 1002. The processor circuitry 1002 includes circuitry such as, but not limited to one or more processor cores and one or more of cache memory, low drop-out voltage regulators (LDOs), interrupt controllers, serial interfaces such as SPI, $I^2C$ or universal programmable serial interface circuit, RTC, timer-counters including interval and watchdog timers, general purpose I/O, memory card controllers such as SD/MMC or similar, USB interfaces, MIPI interfaces, and JTAG test access ports. In some implementations, the processor circuitry 1002 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1002 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more baseband processors, one or more RFICs, one or more microprocessors or controllers, or any suitable combination thereof. The processors (or cores) of the processor circuitry 1002 may be coupled with or may include memory/storage and may be configured to execute instructions stored in the memory/storage to enable various applications or operating systems to run on the platform 1000. In these embodiments, the processors (or cores) of the processor circuitry 1002 is configured to operate application software to provide a specific service to a user of the platform 1000. In some embodiments, the processor circuitry 1002 may be a special-purpose processor/controller to operate according to the various embodiments herein.

As examples, the processor circuitry 1002 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of AMD Zen® Core Architecture, such as Ryzen®, APUs, MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1002 may be a part of an SoC, SiP, MCP, and/or the like, in which the processor circuitry 1002 and other components are formed into a single integrated circuit, or a single package, such as the Edison™ or Galileo™ SoC boards from Intel® Corporation. Other examples of the processor circuitry 1002 are mentioned elsewhere in the present disclosure.

Additionally or alternatively, processor circuitry 1002 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1002 may comprise logic blocks or logic fabric including and other interconnected resources that may be programmed to perform various functions, such as the procedures, methods, functions, etc. of the various embodiments discussed herein. In such embodiments, the circuitry of processor circuitry 1002 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1002 may communicate with system memory circuitry 1004 over an IX 1006 (e.g., a bus). Any number of memory devices may be used to provide for a given amount of system memory. As examples, the memory circuitry 1004 may be random access memory (RAM) in accordance with a Joint Electron Devices Engineering Council (JEDEC) design such as the DDR or mobile DDR standards (e.g., LPDDR, LPDDR2, LPDDR3, or LPDDR4), DRAM, and/or SDRAM). The memory circuitry 1004 may also include NVM such as high-speed electrically erasable memory (commonly referred to as "flash memory"), PRAM, resistive memory such as MRAM, etc., and may incorporate 3D)(POINT memories from Intel® and Micron®. The memory circuitry 1004 may also comprise persistent storage devices, which may be temporal and/or persistent storage of any type, including, but not limited to, non-volatile memory, optical, magnetic, and/or solid state mass storage, and so forth.

The individual memory devices of memory circuitry 1004 may be implemented as one or more of solder down packaged integrated circuits, socketed memory modules, and plug-in memory cards. The memory circuitry 1004 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1004. In embodiments, the memory circuitry 1004 may be disposed in or on a same die or package as the processor circuitry 1002 (e.g., a same SoC, a same SiP, or soldered on a same MCP as the processor circuitry 1002).

To provide for persistent storage of information such as data, applications, OSes, and so forth, a storage circuitry 1008 may also couple to the processor circuitry 1002 via the IX 1006. In an example, the storage circuitry 1008 may be implemented via a solid-state disk drive (SSDD). Other devices that may be used for the storage circuitry 1008 include flash memory cards, such as SD cards, microSD cards, xD picture cards, and the like, and USB flash drives. In low power implementations, the storage circuitry 1008 may be on-die memory or registers associated with the processor circuitry 1002. However, in some examples, the storage circuitry 1008 may be implemented using a micro hard disk drive (HDD). Further, any number of new technologies may be used for the storage circuitry 1008 in addition to, or instead of, the technologies described, such resistance change memories, phase change memories, holographic memories, or chemical memories, among others.

The storage circuitry 1008 store computational logic 1083 (or "modules 1083") in the form of software, firmware, or hardware commands to implement the techniques described herein. The computational logic 1083 may be employed to store working copies and/or permanent copies of computer programs, or data to create the computer programs, for the operation of various components of platform 1000 (e.g., drivers, etc.), an operating system of platform 1000, one or more applications, and/or for carrying out the embodiments discussed herein. The computational logic 1083 may be stored or loaded into memory circuitry 1004 as instructions 1082, or data to create the instructions 1082, for execution by the processor circuitry 1002 to provide the functions described herein. The various elements may be implemented by assembler instructions supported by processor circuitry 1002 or high-level languages that may be compiled into such instructions (e.g., instructions 1070, or data to create the instructions 1070). The permanent copy of the programming instructions may be placed into persistent storage devices of storage circuitry 1008 in the factory or in the field through, for example, a distribution medium (not shown), through a communication interface (e.g., from a distribution server (not shown)), or over-the-air (OTA).

In an example, the instructions 1082 provided via the memory circuitry 1004 and/or the storage circuitry 1008 of FIG. 10 are embodied as one or more non-transitory computer readable storage media (see e.g., NTCRSM 1102 of FIG. 11) including program code, a computer program product or data to create the computer program, with the computer program or data, to direct the processor circuitry 1002 of platform 1000 to perform electronic operations in the platform 1000, and/or to perform a specific sequence or flow of actions, for example, as described with respect to the flowchart(s) and block diagram(s) of operations and functionality depicted previously (see e.g., FIG. 4). The processor circuitry 1002 accesses the one or more non-transitory computer readable storage media over the IX 1006.

Although the instructions 1082 are shown as code blocks included in the memory circuitry 1004 and the computational logic 1083 is shown as code blocks in the storage circuitry 1008, it should be understood that any of the code blocks may be replaced with hardwired circuits, for example, built into an FPGA, ASIC, or some other suitable circuitry. For example, where processor circuitry 1002 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1004 and/or storage circuitry 1008 may store program code of an OS, which may be a general purpose OS or an OS specifically written for and tailored to the computing platform 1000. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be an RTOS, such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®. PikeOS provided by Sysgo AG®, Android Things® provided by Google QNX® RTOS provided by BlackBerry Ltd., or any other suitable RTOS, such as those discussed herein.

The OS may include one or more drivers that operate to control particular devices that are embedded in the platform 1000, attached to the platform 1000, or otherwise communicatively coupled with the platform 1000. The drivers may include individual drivers allowing other components of the platform 1000 to interact or control various I/O devices that may be present within, or connected to, the platform 1000. For example, the drivers may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, actuator drivers to obtain actuator positions of the actuators 1022 and/or control and allow access to the actuators 1022, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the platform 1000 (not shown).

The components may communicate over the IX 1006. The IX 1006 may include any number of technologies, including any of the technologies discussed previously with respect to IX 906 of FIG. 9, or any number of other technologies. The IX 1006 may be a proprietary bus, for example, used in a SoC based system. Other bus systems may be included, such as a Time-Trigger Protocol (TTP) system, a FlexRay system, point-to-point interfaces, and a power bus, among others.

The IX 1006 couples the processor circuitry 1002 to the communication circuitry 1009 for communications with other devices. The communication circuitry 1009 is a hardware element, or collection of hardware elements, used to communicate over one or more networks (e.g., cloud 1001) and/or with other devices (e.g., mesh devices/fog 1064). The communication circuitry 1009 includes baseband circuitry 1010 (or "modem 1010") and RF circuitry 1011 and 1012.

The baseband circuitry 1010 includes one or more processing devices (e.g., baseband processors) to carry out various protocol and radio control functions. Baseband circuitry 1010 may interface with application circuitry of platform 1000 (e.g., a combination of processor circuitry 1002, memory circuitry 1004, and/or storage circuitry 1008) for generation and processing of baseband signals and for controlling operations of the RF circuitry 1011 or 1012. The baseband circuitry 1010 may handle various radio control functions that enable communication with one or more radio networks via the RF circuitry 1011 or 1012. The baseband circuitry 1010 may include circuitry such as, but not limited to, one or more single-core or multi-core processors (e.g., one or more baseband processors) or control logic to process baseband signals received from a receive signal path of the RF circuitry 1011 and/or 1012, and to generate baseband signals to be provided to the RF circuitry 1011 or 1012 via a transmit signal path. In various embodiments, the baseband circuitry 1010 may implement an RTOS to manage resources of the baseband circuitry 1010, schedule tasks, etc. Examples of the RTOS may include OSE™ provided by Enea®, Nucleus RTOS™ provided by Mentor Graphics®, VRTX provided by Mentor Graphics®, ThreadX™ provided by Express Logic®, FreeRTOS, REX OS provided by Qualcomm®, OKL4 provided by OK Labs®, or any other suitable RTOS, such as those discussed herein.

Although not shown by FIG. 10, in one embodiment, the baseband circuitry 1010 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 1009 is a cellular radiofrequency communication system, such as mmWave communication circuitry or some other suitable cellular communication circuitry. In the first example, the protocol processing circuitry 1005 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 1009 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1010 and/or RF circuitry 1011 and 1012. The baseband circuitry 1010 may also support radio communications for more than one wireless protocol.

Continuing with the aforementioned embodiment, the baseband circuitry 1010 includes individual processing device(s) to implement PHY including hybrid automatic repeat request (HARQ) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1009 also includes RF circuitry 1011 and 1012 to enable communication with wireless networks using modulated electromagnetic radiation through a non-solid medium. Each of the RF circuitry 1011 and 1012 include a receive signal path, which may include circuitry to convert analog RF signals (e.g., an existing or received modulated waveform) into digital baseband signals to be provided to the baseband circuitry 1010. Each of the RF circuitry 1011 and 1012 also include a transmit signal path, which may include circuitry configured to convert digital baseband signals provided by the baseband circuitry 1010 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1011 or 1012 using metal transmission lines or the like.

The RF circuitry 1011 (also referred to as a "mesh transceiver") is used for communications with other mesh or fog devices 1064. The mesh transceiver 1011 may use any number of frequencies and protocols, such as 2.4 Gigahertz (GHz) transmissions under the IEEE 802.15.4 standard, using the Bluetooth®/BLE standard, as defined by the Bluetooth® Special Interest Group, or the ZigBee® standard, among others. Any number of RF circuitry 1011, configured for a particular wireless communication protocol, may be used for the connections to the mesh devices 1064. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1011 may communicate using multiple standards or radios for communications at different ranges. For example, the platform 1000 may communicate with close/proximate devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1012 (also referred to as a "wireless network transceiver," a "cloud transceiver," or the like) may be included to communicate with devices or services in the cloud 1001 via local or wide area network protocols. The wireless network transceiver 1012 includes one or more radios to communicate with devices in the cloud 1001. The cloud 1001 may be the same or similar to cloud 258 discussed previously. The wireless network transceiver 1012 may be a LPWA transceiver that follows the IEEE 802.15.4, or IEEE 802.15.4g standards, among others, such as those discussed herein. The platform 1000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1011 and wireless network transceiver 1012, as described herein. For example, the radio transceivers 1011 and 1012 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1011 and 1012 may include radios that are compatible with, and/or may operate according to any one or more of the following radio communication technologies and/or standards including but not limited to those discussed herein.

Network interface circuitry/controller (NIC) 1016 may be included to provide wired communication to the cloud 1001 or to other devices, such as the mesh devices 1064 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1000 via NIC 1016 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1016 may include one or more dedicated processors and/or FPGAs to communicate using one or more of the aforementioned network interface protocols. In some implementations, the NIC 1016 may include multiple controllers to provide connectivity to other networks using the same or different protocols. For example, the platform 1000 may include a first NIC 1016 providing communications to the cloud over Ethernet and a second NIC 1016 providing communications to other devices over another type of network.

The interconnect 1006 may couple the processor circuitry 1002 to an external interface 1018 (also referred to as "I/O interface circuitry" or the like) that is used to connect external devices or subsystems. The external devices include, inter alia, sensor circuitry 1021, actuators 1022, and positioning circuitry 1045. The sensor circuitry 1021 may include devices, modules, or subsystems whose purpose is to detect events or changes in its environment and send the information (sensor data) about the detected events to some other a device, module, subsystem, etc. Examples of such sensors 1021 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); radar sensors including synthetic-aperture radar (SAR) systems; light detection and ranging (LiDAR) sensors; proximity sensors (e.g., infrared (IR) radiation detector and the like), depth sensors, ambient light sensors, ultrasonic transceivers; microphones; etc.

The external interface 1018 connects the platform 1000 to actuators 1022, allow platform 1000 to change its state, position, and/or orientation, or move or control a mechanism or system. The actuators 1022 comprise electrical and/or mechanical devices for moving or controlling a mechanism or system, and converts energy (e.g., electric current or moving air and/or liquid) into some kind of motion. The actuators 1022 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1022 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 1022 based on one or more captured events and/or instructions or control signals received from a service provider and/or various client systems.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the communication circuitry 1009 to communicate with the nodes and components of the positioning network. The positioning circuitry 1045 may also provide position data and/or time data to the application circuitry, which may use the data to synchronize operations with various infrastructure (e.g., radio base stations), for turn-by-turn navigation, or the like.

In some examples, various I/O devices may be present within, or connected to, the platform 1000, which are referred to as input device circuitry 1086 and output device circuitry 1084 in FIG. 10. The input device circuitry 1086 and output device circuitry 1084 include one or more user interfaces designed to enable user interaction with the platform 1000 and/or peripheral component interfaces designed to enable peripheral component interaction with the platform 1000. Input device circuitry 1086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1084 may be included to show information or otherwise convey information, such as sensor readings, actuator position(s), or other like information. Data and/or graphics may be displayed on one or more user interface components of the output device circuitry 1084. Output device circuitry 1084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry 1084 may also include speakers or other audio emitting devices, printer(s), and/or the like. In some embodiments, the sensor circuitry 1021 may be used as the input device circuitry 1086 (e.g., an image capture device, motion capture device, or the like) and one or more actuators 1022 may be used as the output device circuitry 1084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1024 may be coupled to the platform 1000 to power the platform 1000, which may be used in embodiments where the platform 1000 is not in a fixed location. The battery 1024 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1000 is mounted in a fixed location, the platform 1000 may have a power supply coupled to an electrical grid. In these embodiments, the platform 1000 may include power tee circuitry to provide for electrical power drawn from a network cable to provide both power supply and data connectivity to the platform 1000 using a single cable.

PMIC 1026 may be included in the platform 1000 to track the state of charge (SoCh) of the battery 1024, and to control charging of the platform 1000. The PMIC 1026 may be used to monitor other parameters of the battery 1024 to provide failure predictions, such as the state of health (SoH) and the state of function (SoF) of the battery 1024. The PMIC 1026 may include voltage regulators, surge protectors, power alarm detection circuitry. The power alarm detection circuitry may detect one or more of brown out (under-voltage) and surge (over-voltage) conditions. The PMIC 1026 may communicate the information on the battery 1024 to the processor circuitry 1002 over the interconnect 1006. The PMIC 1026 may also include an analog-to-digital (ADC) convertor that allows the processor circuitry 1002 to directly monitor the voltage of the battery 1024 or the current flow from the battery 1024. The battery parameters may be used to determine actions that the platform 1000 may perform, such as transmission frequency, mesh network operation, sensing frequency, and the like. As an example, the PMIC 1026 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1028, or other power supply coupled to a grid, may be coupled with the PMIC 1026 to charge the battery 1024. In some examples, the power block 1028 may be replaced with a wireless power receiver to obtain the power wirelessly, for example, through a loop antenna in the platform 1000. A wireless battery charging circuit, such as an LTC4020 chip from Linear Technologies of Milpitas, Calif., among others, may be included in the PMIC 1026. The specific charging circuits chosen depend on the size of the battery 1024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 11:
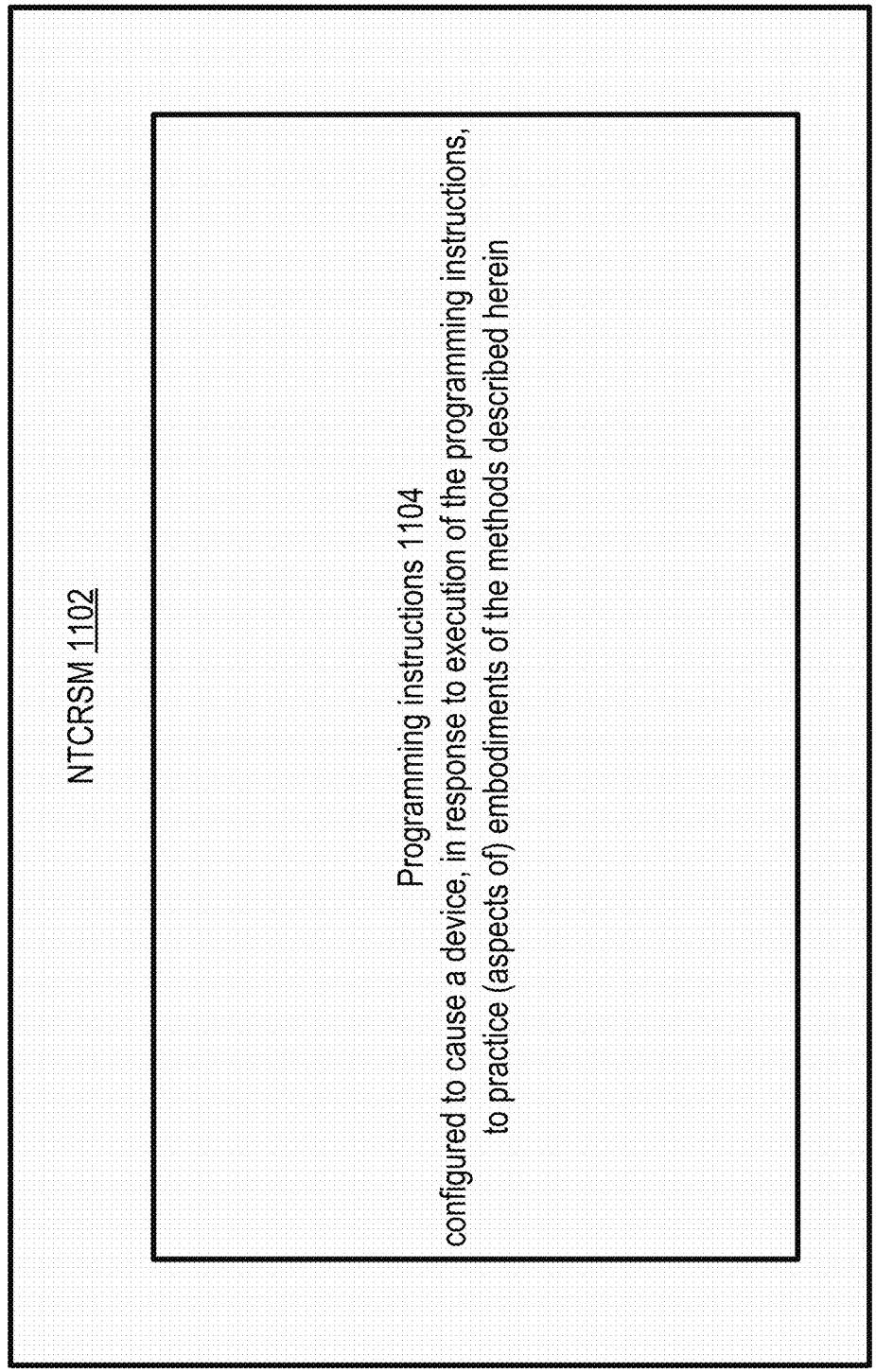
FIG. 11 illustrates an example non-transitory computer-readable storage media that may be suitable for use to store instructions (or data that creates the instructions) that cause an apparatus, in response to execution of the instructions by the apparatus, to practice selected aspects of the present disclosure.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 11 illustrates an example non-transitory computer-readable storage media (NTCRSM) that may be suitable for use to store instructions (or data that creates the instructions) that cause an apparatus (such as any of the devices/components/systems described with regard to FIGS. 1-10), in response to execution of the instructions by the apparatus, to practice selected aspects of the present disclosure. As shown, NTCRSM 1102 may include a number of programming instructions 1104 (or data to create the programming instructions). Programming instructions 1104 may be configured to enable a device (e.g., any of the devices/components/systems described with regard to FIGS. 1-10, in response to execution of the programming instructions, to perform various programming operations associated with operating system functions, one or more applications, and/or aspects of the present disclosure (including various programming operations associated with FIGS. 4-8). In some embodiments, the programming instructions 1104 (or data to create the programming instructions) to be executed may be in a pre-configured form that may require configuration instructions to install or provision the programming instructions 1104 to an apparatus (such as any of the devices/components/systems described with regard to FIGS. 1-10). When installed/provisioned, configured and executed, the programming instructions 1104 can complete or perform various programming operations associated with operating system functions, one or more applications, and/or aspects of the present disclosure (including various programming operations associated with FIGS. 4-8).

In alternate embodiments, programming instructions 1104 (or data to create the instructions) may be disposed on multiple NTCRSM 1102. In alternate embodiments, programming instructions 1104 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1102 may be embodied by devices described for the storage circuitry 1008 and/or memory circuitry 1004 described with regard to FIG. 10. More specific examples (a non-exhaustive list) of a computer-readable medium would include the following: an electrical connection having one or more wires, a portable computer diskette, a hard disk, RAM, ROM, an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code(such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1083, instructions 1082, 1070 discussed previously with regard to FIG. 10) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1000, partly on the system 1000, as a stand-alone software package, partly on the system 1000 and partly on a remote computer or entirely on the remote computer or server (e.g., system 900). In the latter scenario, the remote computer may be connected to the system 1000 through any type of network, including a local area network (LAN), a metropolitan area network (MAN), a wide area network (WAN), or the connection may be made to an external computer (for example, through the Internet using an Internet Service Provider).

III. Examples

Illustrative examples of the devices, systems, and methods disclosed herein are provided below. An embodiment of the devices, systems, and methods may include any one or more, and any combination of, the examples described below.

Example 1 includes an apparatus for providing a sensor arrangement service, the apparatus comprising: processing circuitry coupled with interface circuitry, the interface circuitry being arranged to communicatively couple the apparatus with a plurality of sensors, the plurality of sensors being deployed in a first sensor arrangement such that individual sensors of the plurality of sensors cover respective first sectors of a physical coverage area, wherein the processing circuitry is arranged to: determine, in response to detection of a trigger, a second sensor arrangement based on the trigger and sensor parameters of the individual sensors, the second sensor arrangement indicating respective second sectors of the physical coverage area different than the first sectors, and generate instructions to configure the individual sensors into the second sensor arrangement; and wherein the interface circuitry is further arranged to send the instructions to the individual sensors to implement changes to the first sensor arrangement based on the second sensor arrangement determined.

Example 2 includes the apparatus of example 1 and/or some other examples herein, wherein the processing circuitry is arranged to determine the second sensor arrangement further based on sensor data obtained from the individual sensors.

Example 3 includes the apparatus of examples 1-2 and/or some other examples herein, wherein the first sensor arrangement is based on a model of the physical coverage area, and wherein the model is based on static parameters of the physical coverage area and the sensor parameters of the individual sensors.

Example 4 includes the apparatus of example 3 and/or some other examples herein, wherein the static parameters of the physical coverage area include non-movable physical objects in the physical coverage area and an amount of opacity or transparency of the non-movable physical objects.

Example 5 includes the apparatus of examples 3-4 and/or some other examples herein, wherein the model is further based on statistical information about movement patterns of movable objects moving through the coverage area.

Example 6 includes the apparatus of examples 3-5 and/or some other examples herein, wherein the model comprises a plurality of cells, and wherein, to determine the second sensor arrangement, the processing circuitry is arranged to: rank each sensor of the plurality of sensors based on a number of cells each sensor covers in the first sensor arrangement and a number of cells that are in range of each sensor; and select a combination of sensors of the plurality of sensors according to the rank of each sensor that cover an entirety of the plurality of cells.

Example 7 includes the apparatus of example 6 and/or some other examples herein, wherein each cell of the plurality of cells is associated with a coverage priority, wherein the coverage priority of an individual cell of the plurality of cells is based on a number of sensors covering the individual cell or a number of sectors in which the individual cell is located.

Example 8 includes the apparatus of example 7 and/or some other examples herein, wherein the processing circuitry is arranged to: rank each sensor further based on coverage priorities of cells located in the respective first sectors and the number of sensors of the plurality of sensors.

Example 9 includes the apparatus of example 6 and/or some other examples herein, wherein the processing circuitry is arranged to operate a genetic algorithm to determine the second sensor arrangement.

Example 10 includes the apparatus of examples 1-9 and/or some other examples herein, wherein the processing circuitry is arranged to store the second sensor arrangement in a local storage device or a remote storage system.

Example 11 includes the apparatus of examples 1-10 and/or some other examples herein, wherein the sensor parameters include one or more of a maximum sensing range of an individual sensor, a horizontal field of view (FoV) of an individual sensor, a position of an individual sensor in the physical coverage area, an orientation angle of an individual sensor, and a power setting of an individual sensor.

Example 12 includes the apparatus of examples 1-11 and/or some other examples herein, wherein the trigger includes one or more of failure of a sensor of the plurality of sensors, detection of an object in the physical coverage area, and a change of a size or shape of the physical coverage area.

Example 13 includes the apparatus of examples 1-12 and/or some other examples herein, wherein infrastructure equipment hosts the apparatus, and the interface circuitry is arranged to communicatively couple the infrastructure equipment with a fixed sensor array having the plurality of sensors.

Example 14 includes the apparatus of examples 1-12 and/or some other examples herein, wherein the apparatus is employed as a server, and the interface circuitry is arranged to communicatively couple the server with a plurality of infrastructure equipment, each of the plurality of infrastructure equipment communicatively coupled with a respective fixed sensor array having a set of sensors of the plurality of sensors.

Example 15 includes a method comprising: detecting or causing to detect a trigger to reconfigure a current arrangement of sensors in a sensor network; obtaining or causing to obtain, in response to detection of the trigger, current parameters of the current arrangement, the current parameters indicating positions and orientations of each sensor in the sensor network; operating or causing to operation a genetic algorithm to determine a new arrangement of the sensors in the sensor network based on the trigger and the current parameters, the new arrangement including new parameters indicating at least one new orientation of an individual sensor in the sensor network different than an orientation of the individual sensor in the current arrangement; generating or causing to generate instructions to reconfigure the sensors in the sensor network such that the sensors in the sensor network have positions and orientations indicated by the new arrangement; sending or causing to send the instructions to the individual sensors in the sensor network, the instructions to instruct the sensors in the sensor network to change their positions and orientations according to the new arrangement; and store the new arrangement in a local storage device or a remote storage system.

Example 16 includes the method of example 15 and/or some other examples herein, further comprising: generating or causing to generate a model of the physical coverage area based on static parameters of the physical coverage area, sensor parameters of the individual sensors, and statistical information about movement patterns of movable objects moving through the coverage area.

Example 17 includes the method of example 16 and/or some other examples herein, wherein the sensor parameters include one or more of a maximum sensing range of an individual sensor, a horizontal field of view (FoV) of an individual sensor, a position of an individual sensor in the physical coverage area, an orientation angle of an individual sensor, and a power setting of an individual sensor.

Example 18 includes the method of examples 16-17 and/or some other examples herein, wherein the static parameters of the physical coverage area include non-movable physical objects in the physical coverage area and an amount of opacity or transparency of the non-movable physical objects.

Example 19 includes the method of examples 16-18 and/or some other examples herein, wherein the model comprises a plurality of cells, and the method further comprises: ranking or causing to rank each sensor of the plurality of sensors based on a number of cells each sensor covers in the current arrangement and a number of cells that are in range of each sensor; and selecting or causing to select a combination of sensors of the plurality of sensors according to the rank of each sensor that cover an entirety of the plurality of cells.

Example 20 includes the method of examples 15-19 and/or some other examples herein, wherein the trigger includes one or more of a failure of a sensor of the plurality of sensors, detection of an object in the physical coverage area, and a change of a size or shape of the physical coverage area.

Example 21 includes a method for operating a sensor network comprising one or more infrastructure equipment, each of the one or more infrastructure equipment communicatively coupled with one or more sensors of the sensor network deployed at or in a physical coverage area, and a computing system for providing a sensor arrangement service, the computing system communicatively coupled with the one or more infrastructure equipment, wherein the method comprises: generating or causing to generate, by the computing system, a model of the physical coverage area based on static parameters of the physical coverage area, sensor parameters of the one or more sensors, and statistical information about movement patterns of movable objects moving through the coverage area, the model including information of a current arrangement of the one or more sensors indicating current positions and current orientations of each sensor of the sensor network; detecting or causing to detect, by the computing system, a trigger to reconfigure the current arrangement of the sensors of the sensor network; obtaining or causing to obtain, by the computing system in response to detection of the trigger, the information of the current arrangement from a storage system; determining or causing to determine, by the computing system, a new arrangement of the sensors based on the trigger and the sensor parameters, the new arrangement including new positions or new orientations of one or more sensors in the sensor network; generate instructions to reconfigure the sensor network according to the new arrangement; sending or causing to send, by the computing system the instructions to the one or more infrastructure equipment, the instructions to instruct the one or more infrastructure equipment to adjust the current positions or current orientations to the new positions or new orientations of the new arrangement; and storing or causing to store, by the computing system in the storage system, the new arrangement in association with the model.

Example 22 includes the method of example 21 and/or some other examples herein, wherein the sensor parameters include one or more of a maximum sensing range, a field of view, a sensor position in the physical coverage area, an orientation angle, and power settings; and the static parameters of the physical coverage area include non-movable physical objects in the physical coverage area and an amount of opacity or transparency of the non-movable physical objects.

Example 23 includes the method of examples 21-22 and/or some other examples herein, wherein the model comprises a plurality of cells, and the method comprises: ranking or causing to rank, the computing system, each sensor of the plurality of sensors based on a number of cells each sensor covers in the current arrangement and a number of cells that are in range of each sensor; and selecting or causing to select, the computing system, a combination of sensors of the plurality of sensors according to the rank of each sensor that cover an entirety of the plurality of cells.

Example 24 includes the method of examples 21-23 and/or some other examples herein, wherein the trigger includes one or more of a failure of a sensor of the plurality of sensors, detection of an object in the physical coverage area, and a change of a size or shape of the physical coverage area.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a datagram, packet, frame, segment, protocol data unit (PDU), or message as described in or related to any of examples 1-24, or portions or parts thereof, or otherwise described in the present disclosure.

Example 32 may include a signal encoded with data as described in or related to any of examples 1-24, or portions or parts thereof, or otherwise described in the present disclosure.

Example 33 may include a signal encoded with a datagram, packet, frame, segment, protocol data unit (PDU), or message as described in or related to any of examples 1-24, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 35 may include a computer program comprising instructions, wherein execution of the program by a processing element is to cause the processing element to carry out the method, techniques, or process as described in or related to any of examples 1-24, or portions thereof.

Example 36 may include a signal in a wireless network as shown and described herein. Example 37 may include a method of communicating in a wireless network as shown and described herein. Example 38 may include a system for providing wireless communication as shown and described herein. Example 39 may include a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "memory" and/or "memory circuitry" may represent one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

As used herein, the term "module" is one or more independent electronic circuits packaged onto a circuit board, SoC, SiP, MCP, etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality.

As used herein, the term "element" refers to a unit that is indivisible at a given level of abstraction and has a clearly defined boundary, wherein an element may be any type of entity including, for example, one or more devices, systems, controllers, network elements, modules, etc., or combinations thereof. As used herein, the term "device" refers to a physical entity embedded inside, or attached to, another physical entity in its vicinity, with capabilities to convey digital information from or to that physical entity. As used herein, the term "entity" refers to a distinct component of an architecture or device, or information transferred as a payload. As used herein, the term "controller" refers to an element or entity that has the capability to affect a physical entity, such as by changing its state or causing the physical entity to move. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like. As used herein, the terms "vehicle-to-everything" or "V2X" may refer to any communication involving a vehicle as a source or destination of a message, and may also encompass or be equivalent to vehicle-to-vehicle communications (V2V), vehicle-to-infrastructure communications (V2I), vehicle-to-network communications (V2N), vehicle-to-pedestrian communications (V2P), enhanced V2X communications (eV2X), cellular V2X (C-V2X), or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources. As used herein, the term "architecture" refers to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

As used herein, the terms "instantiate," "instantiation," and the like refers to the creation of an instance, and an "instance" refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a multi-access edge applications The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus for providing a sensor arrangement service, the apparatus comprising:
    processing circuitry coupled with interface circuitry, the interface circuitry being arranged to communicatively couple the apparatus with a plurality of sensors, the plurality of sensors being deployed in a first sensor arrangement such that individual sensors of the plurality of sensors cover respective first sectors of a physical coverage area, wherein the processing circuitry is arranged to:
    operate a genetic algorithm to determine, in response to detection of a trigger, a second sensor arrangement based on the trigger and sensor parameters of the individual sensors, the second sensor arrangement indicating respective second sectors of the physical coverage area different than the first sectors, and generate instructions to configure the individual sensors into the second sensor arrangement;

wherein the interface circuitry is further arranged to send the instructions to the individual sensors to implement changes to the first sensor arrangement based on the second sensor arrangement determined, wherein the genetic algorithm comprises a crossover function and a mutation function, and the processing circuitry is arranged to:

operate the crossover function to:

identify one or more of most useful sensors of the plurality of sensors and discard other sensors of the plurality of sensors not identified as the one or more of the most useful sensors; and rank the individual sensors; and select a number of highest ranking sensors of the individual sensors until the physical coverage area or a portion of the physical coverage area is covered; and operate the mutation function to modify a position, orientation angle, or deletion of the selected of the number of highest ranking sensors produced by the crossover function.

2. The apparatus claim of 1, wherein the processing circuitry is arranged to determine the second sensor arrangement further based on sensor data obtained from the individual sensors.

3. The apparatus of claim 1, wherein the first sensor arrangement is based on a model of the physical coverage area, and wherein the model is based on static parameters of the physical coverage area and the sensor parameters of the individual sensors.

4. The apparatus of claim 3, wherein the static parameters of the physical coverage area include non-movable physical objects in the physical coverage area and an amount of opacity or transparency of the non-movable physical objects.

5. The apparatus of claim 3, wherein the model is further based on statistical information about movement patterns of movable objects moving through the physical coverage area.

6. The apparatus of claim 3, wherein the model comprises a plurality of cells, and wherein, to rank the individual sensors, the processing circuitry is arranged to:

assign a rank to each of the individual sensors based on a number of cells in the plurality of cells covered by the individual sensors in the first sensor arrangement and a number of cells in the plurality of cells that are in range of the individual sensors; and select a combination of the plurality of sensors according to the assigned ranks such that the combination of the plurality of sensors covers an entirety of the plurality of cells.

7. The apparatus of claim 6, wherein each cell of the plurality of cells is associated with a coverage priority, wherein the coverage priority of an individual cell of the plurality of cells is based on a number of the plurality of sensors covering the individual cell or a number of the first and second sectors in which the individual cell is located.

8. The apparatus of claim 7, wherein the processing circuitry is arranged to:

rank each sensor of the plurality of sensors further based on coverage priorities of the plurality of cells located in the respective first sectors and the number of the plurality of sensors.

9. The apparatus of claim 1, wherein the processing circuitry is arranged to store the second sensor arrangement in a local storage device or a remote storage system.

10. The apparatus of claim 1, wherein the sensor parameters include one or more of a maximum sensing range of an individual sensor of the individual sensors, a horizontal field of view (FoV) of the individual sensor of the individual sensors, a position of the individual sensor of the individual sensors in the physical coverage area, an orientation angle of the individual sensor of the individual sensors, and a power setting of the individual sensor of the individual sensors.

11. The apparatus of claim 1, wherein the trigger includes one or more of failure of a sensor of the plurality of sensors, detection of an object in the physical coverage area, and a change of a size or shape of the physical coverage area.

12. The apparatus of claim 1, wherein infrastructure equipment hosts the apparatus, and the interface circuitry is arranged to communicatively couple the infrastructure equipment with a fixed sensor array having the plurality of sensors.

13. The apparatus of claim 1, wherein the apparatus is employed as a server, and the interface circuitry is arranged to communicatively couple the server with a plurality of infrastructure equipment, each of the plurality of infrastructure equipment communicatively coupled with a respective fixed sensor array having a set of sensors of the plurality of sensors.

14. One or more non-transitory computer-readable media (NTCRM) comprising instructions, wherein execution of the instructions by a computing device is to cause the computing device to:

detect a trigger to reconfigure a current arrangement of a plurality of sensors in a sensor network;

obtain, in response to detection of the trigger, current parameters of the current arrangement, the current parameters indicating positions and orientations of each sensor of the plurality of sensors in the sensor network;

operate a genetic algorithm to determine a new arrangement of the sensors in the sensor network based on the trigger and the current parameters, the new arrangement including new parameters indicating at least one new orientation of an individual sensor of the plurality of sensors in the sensor network different than an orientation of the individual sensor of the plurality of sensors in the current arrangement;

generate reconfiguration instructions to reconfigure the plurality of sensors in the sensor network according to the new arrangement such that the plurality of sensors in the sensor network have the positions and the orientations indicated by the new arrangement;

send the reconfiguration instructions to the individual sensor in the sensor network, the reconfiguration instructions to instruct the plurality of sensors in the sensor network to change the positions and the orientations according to the new arrangement; and store the new arrangement in a local storage device or a remote storage system, and wherein the genetic algorithm comprises a crossover function and a mutation function, and the computing device is arranged to:

operate the crossover function to:

identify one or more most useful sensors of the plurality of sensors and discard other sensors of the plurality of sensors not identified as the one or more of the most useful sensors; and rank the plurality of sensors; and select a number of highest ranking sensors of the plurality of sensors until a physical coverage area or a portion of the physical coverage area is covered; and operate the mutation function to modify a position, orientation angle, or deletion of the selected number of the highest ranking sensors produced by the crossover function.

15. The one or more NTCRM of claim 14, wherein the execution of the instructions is to cause the computing device to:

generate a model of the physical coverage area covered by the plurality of sensors in the sensor network based on static parameters of the physical coverage area, sensor parameters of the individual sensor, and statistical information about movement patterns of movable objects moving through the physical coverage area.

16. The one or more NTCRM of claim 15, wherein the sensor parameters include one or more of a maximum sensing range of the individual sensor, a horizontal field of view (FoV) of the individual sensor, a position of the individual sensor in the physical coverage area, an orientation angle of the individual sensor, and a power setting of the individual sensor.

17. The one or more NTCRM of claim 15, wherein the static parameters of the physical coverage area include non-movable physical objects in the physical coverage area and an amount of opacity or transparency of the non-movable physical objects.

18. The one or more NTCRM of claim 15, wherein the model comprises a plurality of cells, and wherein the execution of the instructions is to cause the computing device to:

assign a rank each sensor of the plurality of sensors, the ranking of each sensor being based on a number of cells in the plurality of cells covered by each sensor in the current arrangement and a number of cells in the plurality of cells that are within range of each sensor; and select a combination of the plurality of sensors of the sensor network according to the assigned ranks such that the combination of the plurality of sensors covers an entirety of the plurality of cells.

19. The one or more NTCRM of claim 14, wherein the trigger includes one or more of a failure of the individual sensor of the plurality of sensors of the sensor network, detection of an object in the physical coverage area covered by the plurality of sensors in the sensor network, and a change of a size or shape of the physical coverage area.

20. A sensor network comprising:

one or more infrastructure equipment, each of the one or more infrastructure equipment communicatively coupled with one or more sensors of the sensor network deployed at or in a physical coverage area; and a computing system for providing a sensor arrangement service, the computing system communicatively coupled with the one or more infrastructure equipment, the computing system arranged to:

generate a model of the physical coverage area based on static parameters of the physical coverage area, sensor parameters of the one or more sensors, and statistical information about movement patterns of movable objects moving through the coverage area, the model including information of a current arrangement of the one or more sensors indicating current positions and current orientations of each sensor of the one or more sensors of the sensor network;

detect a trigger to reconfigure the current arrangement of the one or more sensors of the sensor network;

obtain, in response to detection of the trigger, the information of the current arrangement from a storage system;

operate a genetic algorithm to determine a new arrangement of the one or more sensors based on the trigger and the sensor parameters, the new arrangement including new positions or new orientations of the one or more sensors in the sensor network;

generate instructions to reconfigure the sensor network according to the new arrangement;

send the instructions to the one or more infrastructure equipment, the instructions to instruct the one or more infrastructure equipment to adjust the current positions or current orientations to the new positions or new orientations of the new arrangement; and store, in the storage system, the new arrangement in association with the model, and wherein the genetic algorithm comprises a crossover function and a mutation function, and the computing system is arranged to:

operate the crossover function to:

identify one or more most useful sensors of the one or more sensors and discard other sensors of the one or more sensors not identified as the one or more of the most useful sensors; and rank the one or more sensors: and select a number of highest ranking sensors of the one or more sensors until the physical coverage area or a portion of the physical coverage area is covered; and operate the mutation function to modify a position, orientation angle, or deletion of the selected number of the highest ranking sensors produced by the crossover function.

21. The sensor network of claim 20, wherein:

the sensor parameters include one or more of a maximum sensing range, a field of view, a sensor position in the physical coverage area, an orientation angle, and power settings; and the static parameters of the physical coverage area include non-movable physical objects in the physical coverage area and an amount of opacity or transparency of the non-movable physical objects.

22. The sensor network of claim 20, wherein the model comprises a plurality of cells, and the computing system is arranged to:

assign a rank each sensor of the one or more sensors of the sensor network based on a number of cells in the plurality of cells covered by each sensor and a number of cells in the plurality of cells that are within range of each sensor; and select a combination of the one or more sensors of the sensor network according to the assigned ranks such that the combination of the one or more sensors covers an entirety of the plurality of cells.

23. The sensor network of claim 20, wherein the trigger includes one or more of a failure of the one or more sensors of the sensor network, detection of an object in the physical coverage area, and a change of a size or shape of the physical coverage area.

* * * * *